(12) United States Patent
Hattori et al.

(10) Patent No.: US 7,481,501 B2
(45) Date of Patent: Jan. 27, 2009

(54) ANTI-LOCK BRAKE SYSTEM AND SENSOR UNIT FOR THE SAME

(75) Inventors: Yutaka Hattori, Kanagawa (JP); Yasuo Hatano, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 217 days.

(21) Appl. No.: 10/547,384

(22) PCT Filed: Jun. 16, 2004

(86) PCT No.: PCT/JP2004/008441

§ 371 (c)(1),
(2), (4) Date: Aug. 31, 2005

(87) PCT Pub. No.: WO2004/110839

PCT Pub. Date: Dec. 23, 2004

(65) Prior Publication Data

US 2006/0170281 A1 Aug. 3, 2006

(30) Foreign Application Priority Data

Jun. 17, 2003 (JP) ............................. 2003-172482
Mar. 2, 2004 (JP) ............................. 2004-057359

(51) Int. Cl.
*B60T 8/00* (2006.01)

(52) U.S. Cl. ...................................... 303/182; 303/183

(58) Field of Classification Search ............... 303/20, 303/193, 185, 15, 183; 188/1.11 L, 1.11 E; 340/435–441, 466, 467; 301/95.101; 701/1, 701/29, 70, 72

See application file for complete search history.

(56) References Cited

U.S. PATENT DOCUMENTS 5,951,122 A * 9/1999 Murphy ...................... 303/163

(Continued)

FOREIGN PATENT DOCUMENTS

JP 50-006992 A 1/1975

(Continued)

OTHER PUBLICATIONS

PCT International Search Report for PCT/JP2004/008441 mailed on Sep. 21, 2004.

*Primary Examiner*—Christopher P Schwartz
(74) *Attorney, Agent, or Firm*—Knobbe Martens Olson & Bear LLP

(57) ABSTRACT

An anti-lock brake system and a sensor unit for the system, where acceleration occurring in a wheel is easily detected with high accuracy to perform braking control of a motor vehicle. Sensor units (100) having acceleration sensors that detect acceleration occurring, with the rotation of tires (300), in X, Y, and Z directions including the tire rotating direction are provided on rotating bodies of rotation mechanism portions including each tire (300). The sensor units (100) transmit digital values of the detected result as digital information by an electromagnetic wave. The digital information is received by a monitor device (200) provided on each tire house, and an acceleration value obtained by calculation is outputted to a brake control unit (600). The brake control unit (600) estimates a strain amount of each tire (300) based on the obtained acceleration value and previously memorized strain characteristic information, controls a pressure regulating valve (630) based on the estimated tire strain amount and a detected result of a rotating speed of each tire (300), and drives a brake driving actuator (640).

24 Claims, 33 Drawing Sheets

U.S. PATENT DOCUMENTS

| | | | |
|---|---|---|---|
| 6,149,190 A * | 11/2000 | Galvin et al. | 280/735 |
| 6,199,874 B1 * | 3/2001 | Galvin et al. | 280/5.514 |
| 6,357,833 B1 * | 3/2002 | Bajer | 301/95.101 |
| 6,448,891 B2 * | 9/2002 | Barnett | 340/438 |
| 6,512,364 B1 * | 1/2003 | Okada | 324/158.1 |
| 6,972,672 B2 * | 12/2005 | Desai | 340/444 |
| 7,168,321 B2 * | 1/2007 | Terada et al. | 73/514.34 |
| 2003/0128107 A1 * | 7/2003 | Wilkerson | 340/435 |
| 2003/0197603 A1 * | 10/2003 | Stewart et al. | 340/442 |
| 2005/0033486 A1 * | 2/2005 | Schmitt et al. | 701/1 |
| 2005/0116531 A1 * | 6/2005 | Lehmann | 301/95.101 |
| 2005/0179530 A1 * | 8/2005 | Stewart et al. | 340/447 |
| 2005/0199434 A1 * | 9/2005 | Okada | 180/282 |
| 2005/0229720 A1 * | 10/2005 | Hanazawa et al. | 73/862.042 |
| 2006/0108170 A1 * | 5/2006 | Ishikawa et al. | 180/282 |
| 2008/0065305 A1 * | 3/2008 | Hattori et al. | 701/70 |

FOREIGN PATENT DOCUMENTS

| | | | |
|---|---|---|---|
| JP | 60-162959 A | | 8/1985 |
| JP | 05-338528 A | | 12/1993 |
| JP | 11-242050 | * | 9/1999 |
| JP | 11-242050 A | | 9/1999 |
| JP | 2000-306188 A | | 11/2000 |
| JP | 2001-018775 A | | 1/2001 |
| JP | 2001-182578 A | | 7/2001 |
| JP | 2001-215175 A | | 8/2001 |
| JP | 2002-137721 A | | 5/2002 |
| JP | 2002-160616 A | | 6/2002 |
| JP | 2003-016565 A | | 1/2003 |
| JP | 2003-054229 A | | 2/2003 |

* cited by examiner

*Fig.* 2

*Fig.* 10
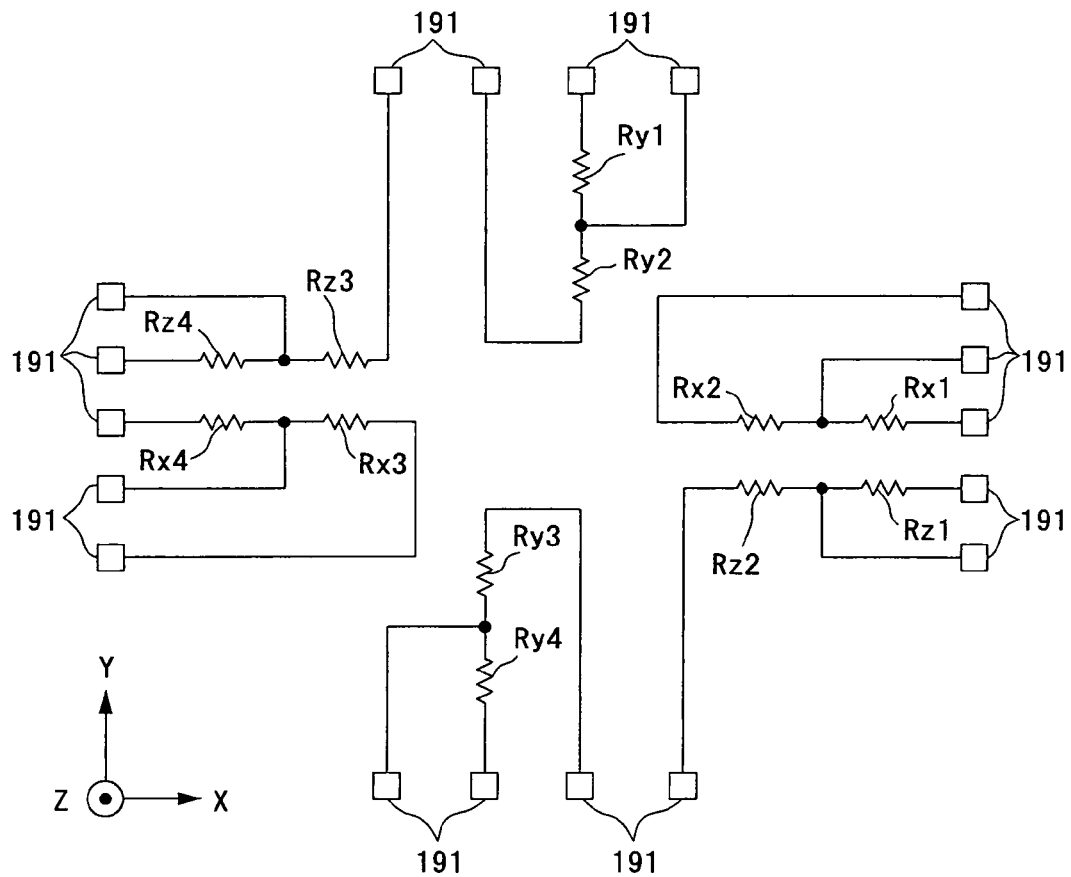
*Fig.* 11
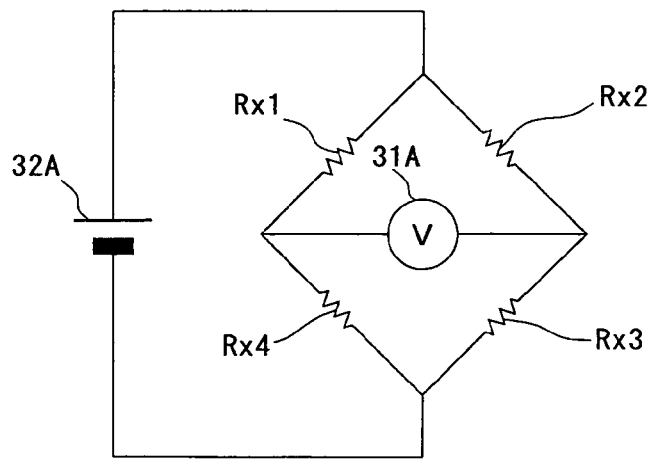

*Fig.* 12
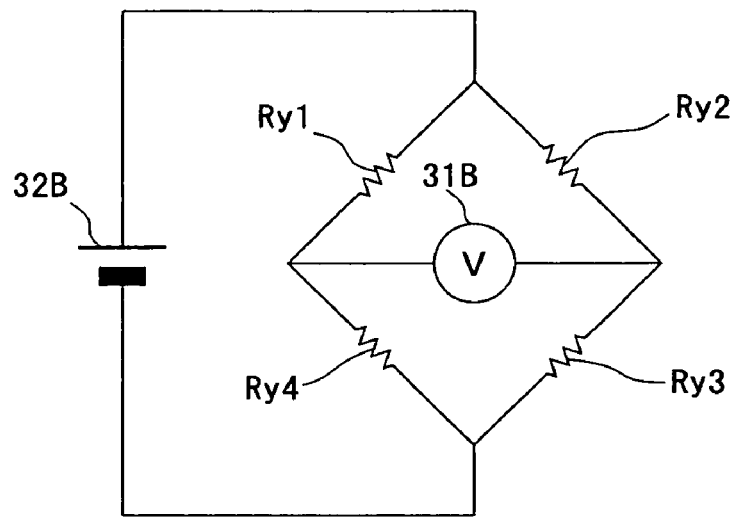
*Fig.* 13
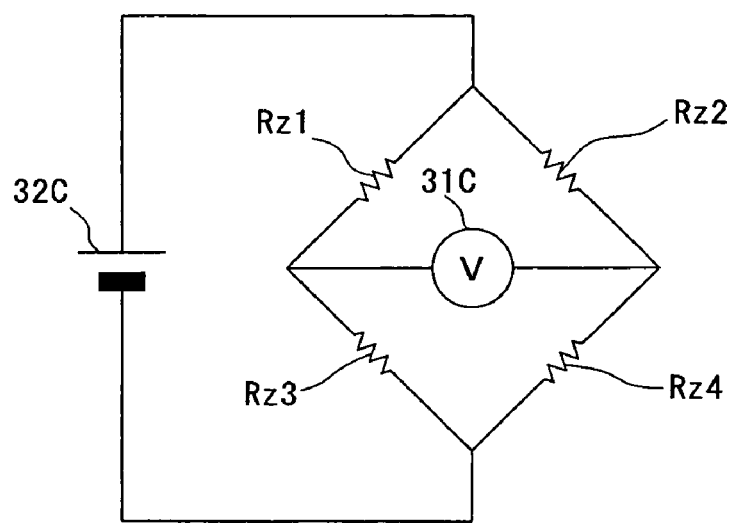

*Fig.* 16

*Fig.* 18
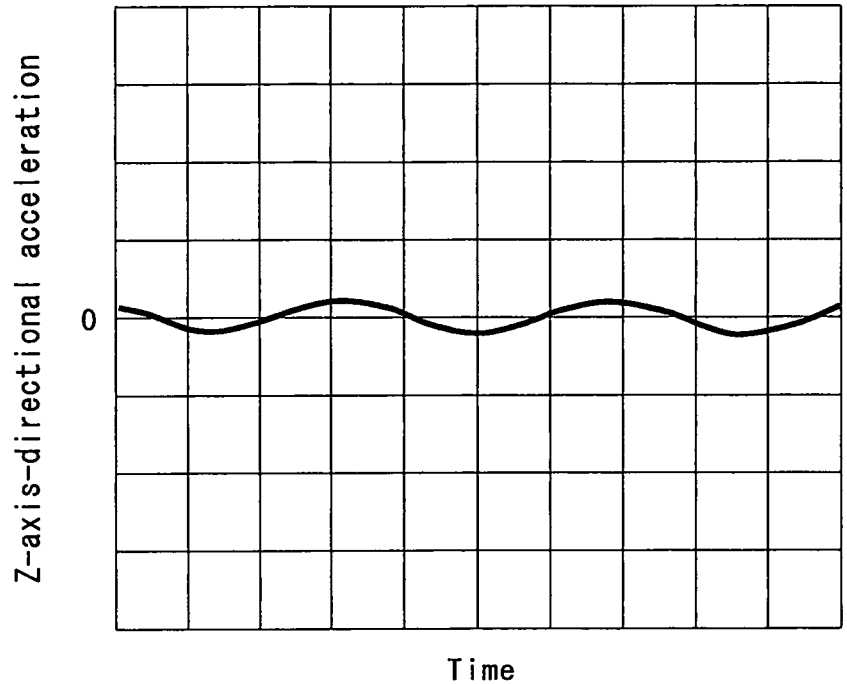
*Fig.* 19
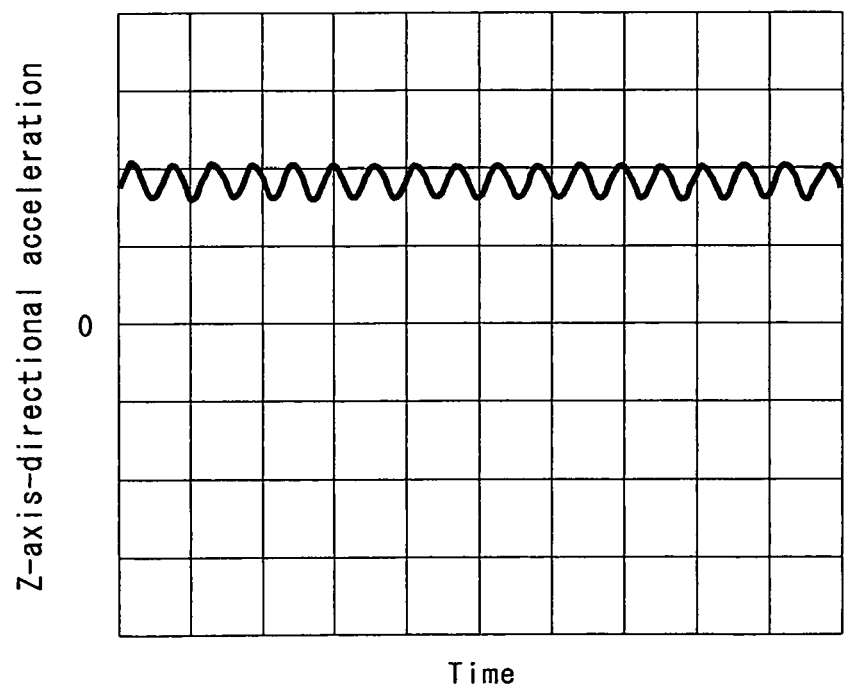

*Fig.* 24
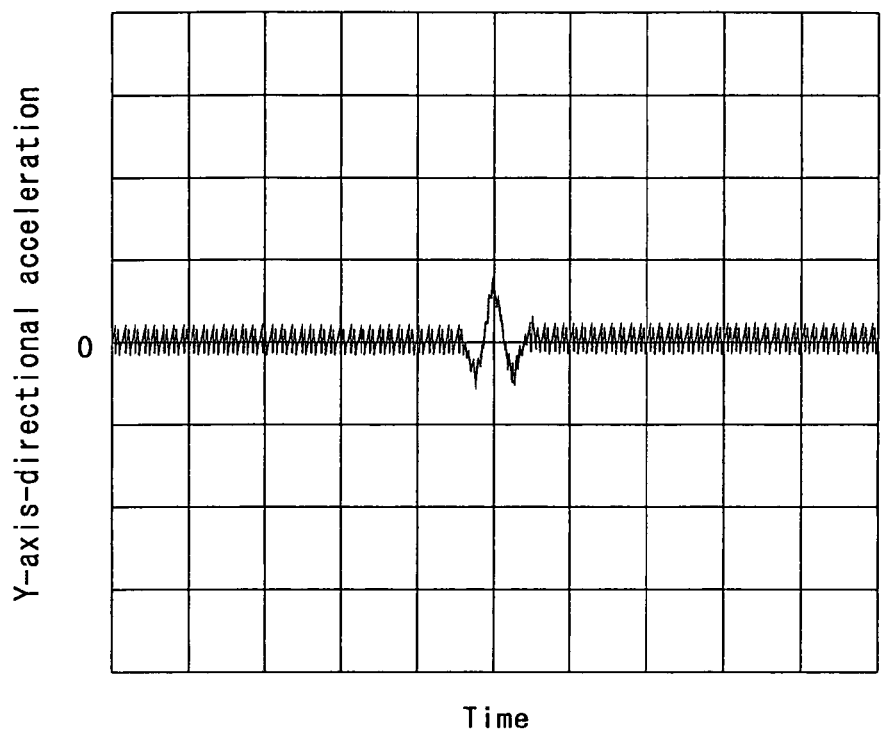
*Fig.* 25
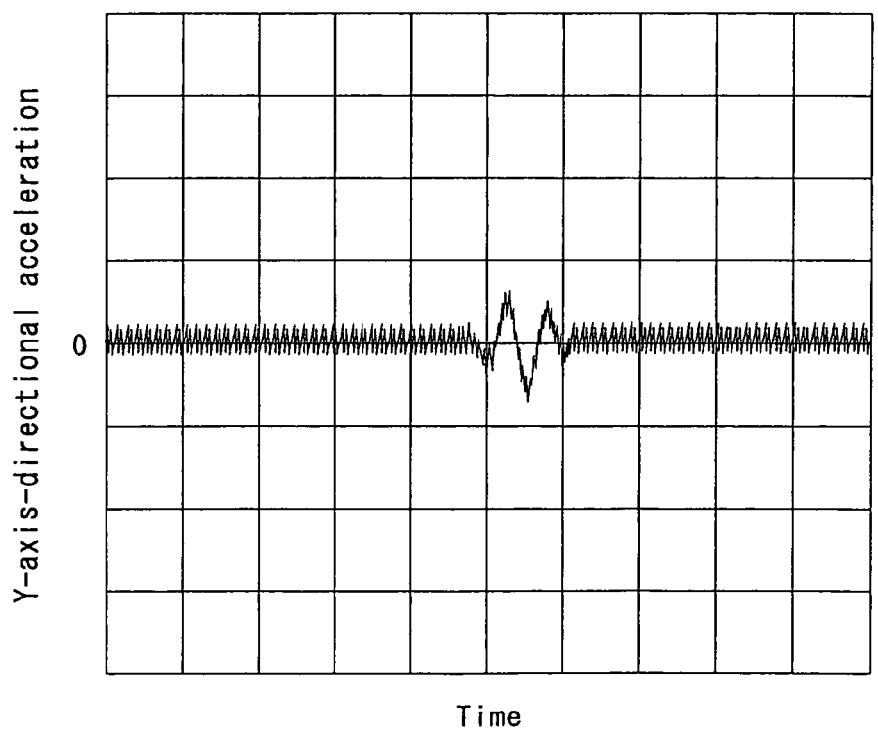

*Fig.* 26
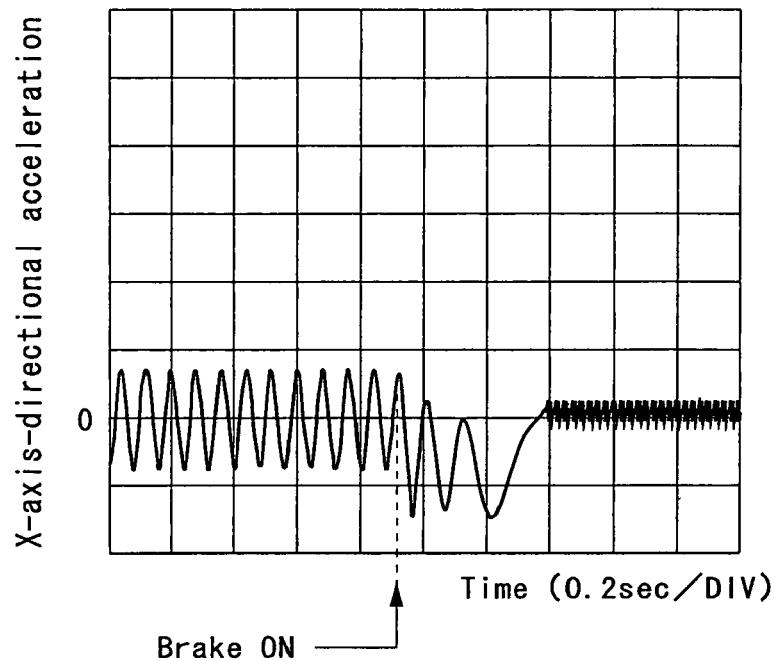
*Fig.* 27
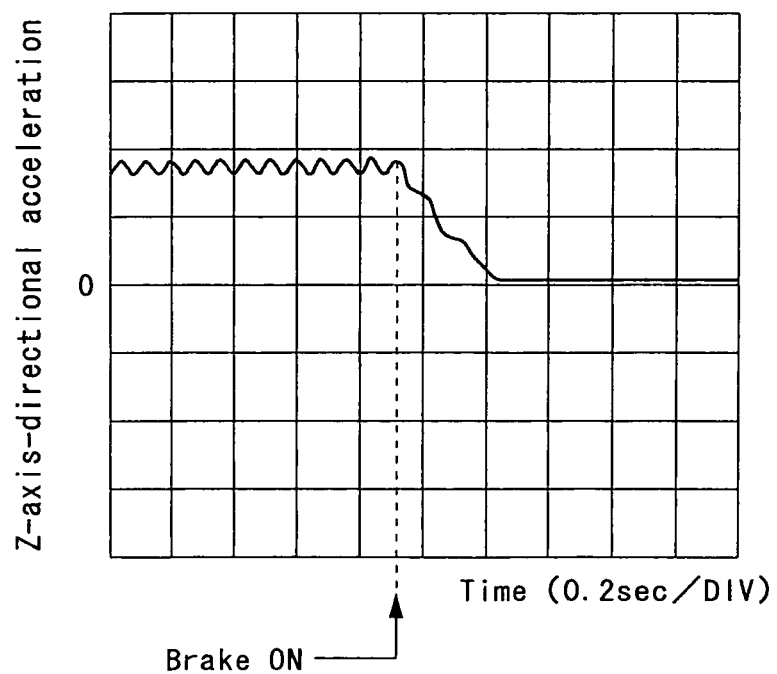

ANTI-LOCK BRAKE SYSTEM AND SENSOR UNIT FOR THE SAME

TECHNICAL FIELD

The present invention relates to an anti-lock brake system for performing proper braking by detecting the acceleration applied to a wheel while a vehicle runs and a sensor unit for the system.

BACKGROUND ART

Conventionally, as matters to which attention must be paid to perform safety running of a vehicle, the following are listed: setting air pressure in a tire of a vehicle to a proper state and paying attention to an abraded state of the tire. For example, when the air pressure in a tire lowers, a puncture occurrence rate increases and burst occurs in high-speed running and thereby, a serious accident is caused. Therefore, a driver must always check tires.

However, even if checking tires and keeping states of the tires in preferable states, when a road is wet because of a rainy day and the friction force between the road and the tires lowers, a slip occurs when applying a brake and a vehicle moves in an unexpected direction, and thereby, an accident is caused.

To prevent an accident which is generated due to the slip or sudden acceleration or the like, an anti-lock brake system (hereafter referred to as ABS), a traction control system, and moreover a stability control system including a YAW sensor, or the like are developed.

For example, the ABS is a system for detecting the rotating state of each tire and controlling a braking force in accordance with the detection result so as to prevent each tire from becoming a lock state.

As the rotating state of each tire, it is possible to detect the rotating speed, air pressure, deflection, or the like of each tire and use the detection result for control.

As examples of the above control systems, the following are known: an automobile brake system disclosed in Japanese Patent Publication No. (Hei) 05-338528 (hereafter referred to as Patent Document 1), a brake control system disclosed in Japanese Patent Publication No. 2001-018775 (hereafter referred to as Patent Document 2), a vehicle control method and apparatus disclosed in Japanese Patent Publication No. 2001-182578 (hereafter referred to as Patent Document 3), a vehicle motion control system disclosed in Japanese Patent Publication No. 2002-137721 (hereafter referred to as Patent Document 4), and a brake system disclosed in Japanese Patent Publication No. 2002-160616 (hereafter referred to as Patent Document 5).

Patent Document 1 discloses a brake system in which a load is supplied from a vacuum tank to a vacuum booster connected with a brake, a load is supplied from a vacuum pump to the vacuum tank, the vacuum pump is driven by a pump motor and thereby, and the pump motor is controlled so that the vacuum pump operates when a state in which decelerated acceleration of an automobile having reached a predetermined value is detected by an acceleration sensor 14 to prevent a change of operation feelings during a sudden brake operation and a brake operation immediately after the sudden brake operation.

Patent Document 2 discloses a brake control system having control means for executing ABS control, in which control means is provided with: lateral acceleration estimating means for estimating lateral acceleration generated in a vehicle; and comparing-determining means for comparing estimated lateral acceleration by the lateral acceleration estimating means, estimated lateral acceleration by vehicle behavior detecting means, and detected lateral acceleration detected by a lateral acceleration sensor included in the vehicle behavior detecting means, and which determines that it is the period during normal rotation comparable with a rudder angle when the difference between the accelerations is less than a predetermined value and determines that it is the period during non-normal rotation when the difference is equal to or more than the predetermined value so as to change control at the time of determination of normal rotation and the time of non-normal rotation in ABS control.

Patent Document 3 discloses a vehicle control method and apparatus in which a control signal for adjusting the deceleration and/or acceleration of a vehicle is formed by a corresponding set value, a correction coefficient showing vehicle acceleration or vehicle deceleration generated by a tilt of a running road surface is formed and the correction coefficient is superimposed on the set value to improve the setting of vehicle deceleration and/or vehicle acceleration.

Patent Document 4 discloses a vehicle motion control unit for performing slip control for keeping a slip rate in a proper range by obtaining the slide-slip angle change speed $\beta'$ of the center-of-gravity point as an actual yawing motion state value of a vehicle having a plurality of wheels, generating a yawing moment which increases as the absolute value of the change speed $\beta'$ and decreases the absolute value of the change speed $\beta'$ by working a brake fluid pressure $\Delta P$ to any brake of right and left rear wheels when the absolute value of the change speed $\beta'$ is equal to or more than a set value $\beta_0'$, continuing determination on whether slip control is necessary for a wheel to which the brake fluid pressure $\Delta P$ is worked also during the yawing moment control, and when the slip control is necessary, restraining the brake fluid pressure $\Delta P$.

Patent Document 5 discloses a brake system having at least two sensors of an acceleration sensor for detecting the acceleration in the longitudinal direction of a vehicle, a wheel speed sensor for detecting the wheel speed of each wheel, and a brake pressure sensor for detecting a brake pressure, computing a target brake pressure in accordance with feedback from at least two sensors, computing a designated current at a designated current computing portion in accordance with the above computing result, supplying the designated current to a brake driving actuator, generating a braking force in accordance with the magnitude of the designated current and thereby, capable of restraining an output trouble even if a disturbance occurs or one sensor breaks down.

Moreover, as a method for detecting the rotating speed of a tire, as shown in FIGS. 31 and 32, a method is generally used which detects the rotating speed of a tire by a rotor 1 to be rotated with a wheel carrier and a pickup sensor 2. In the case of this method, a magnetic flux density is changed when a plurality of concave and convex portions formed on the periphery of the rotor 1 at equal intervals cross a magnetic field generated by the pickup sensor 2 and a pulsed voltage is generated in the coil of the pickup sensor 2. By detecting the pulse, it is possible to detect a rotating speed. An example of the basic principles of this method is disclosed in Japanese Patent Publication No. (Sho) 52-109981.

Patent Document 1: Japanese Patent Publication No. (Hei) 05-338528

Patent Document 2: Japanese Patent Publication No. 2001-018775

Patent Document 3: Japanese Patent Publication No. 2001-182578

Patent Document 4: Japanese Patent Publication No. 2002-137721

Patent Document 5: Japanese Patent Publication No. 2002-160616

Patent Document 6: Japanese Patent Publication No. (Sho) 52-109981

DISCLOSURE OF THE INVENTION

Problems to be Solved by the Invention

However, in the case of the technique disclosed in the above Patent Document 1, though the operation feeling of braking control is improved, it is difficult to set a threshold value when assuming that a brake torque exceeds the friction force between a tire and a road surface when the friction force between the tire and the road surface is changed and a slip occurs.

Moreover, in the case of the techniques disclosed in the above Patent Documents 2 to 5, the control more advanced than the technique disclosed in Patent Document 1 is performed that the acceleration of a vehicle is detected during running and braking control of the vehicle is performed in accordance with the detected acceleration. However, even for the same vehicle, the friction force between a tire and a road surface depends on the type of a tire used for the vehicle and its air pressure. Moreover, because there is a vehicle for individually driving-controlling each tire such as 4WD vehicle, advance control may not be performed even for the control considering the acceleration of the vehicle during running.

Furthermore, in the case of the method for detecting a rotating speed by using the above rotor and pickup sensor, detection accuracy is decided in accordance with the number of concave and convex portions formed on the periphery of the rotor and 80 concave and convex portions are a limit as the number of concave and convex portions. Though it is possible to detect the rotation of an accuracy of $1/80$ of one turn, it is very difficult to obtain an accuracy of $1/80$ of one turn or higher because of the influence of noise pulses.

It is an object of the present invention to provide an anti-lock brake system for performing braking control of a vehicle by easily detecting the acceleration generated in a wheel at a high accuracy and a sensor unit for the system.

Means for Solving the Problems

To achieve the above object, the present invention provides a vehicle anti-lock brake system constituted so as to drive a brake driving actuator in accordance with a detection result of the brake operation state of a vehicle and generate a target braking force and provided with a sensor unit set to a rotating mechanism portion including a body of rotation for fixing a wheel set to the vehicle body side and rotating the wheel and the wheel, detecting first acceleration generated in the direction orthogonal to a rotating shaft according to rotation and second acceleration generated in the rotating direction, converting the detection results into digital values, and transmitting digital information including the digital values, a monitor system for receiving the digital information transmitted from the sensor unit and obtaining the detection results of the first acceleration and second acceleration, and driving means for driving the brake driving actuator in accordance with detection results of the first acceleration and second acceleration obtained by the monitor system.

According to an anti-block brake system constituted of the above configuration, the sensor unit is set to a predetermined position of the rotating mechanism portion, first acceleration generated in the direction orthogonal to the rotating shaft in accordance with rotation and second acceleration generated in the rotating direction are detected, the detection results are converted into digital values, and digital information including the digital values is transmitted.

Moreover, the digital information transmitted from the sensor unit is received by the monitor system, the detection results of the first acceleration and second acceleration are obtained, and the brake driving actuator is driven by the driving means in accordance with detection results of the first acceleration and second acceleration obtained by the monitor system.

In this case, because a centrifugal force increases as the rotating speed of the rotating mechanism portion increases, the first acceleration increases as the rotating speed increases. Moreover, the position of the sensor unit moves in accordance with the rotating speed and the direction of the gravitational acceleration applied to the sensor unit changes. Therefore, the magnitude of the second acceleration fluctuates like a sine wave in accordance with rotation and the period of the fluctuation becomes shorter as the rotating speed increases. Therefore, it is possible to obtain the speed of a vehicle from the detection result of the first acceleration and the rotating speed of a wheel per each unit time from the detection result of the second acceleration.

Moreover, the present invention provides an anti-lock brake system constituted of the above configuration, in which the sensor unit has means for detecting third acceleration generated in the rotating-shaft direction, converting the detection result into a digital value, and transmitting the digital information including the digital value of the third acceleration to the monitor system, the monitor system has means for obtaining the detection result of the third acceleration, and the driving means has means for driving the brake driving actuator in accordance with the detection results of the first acceleration, second acceleration, and third acceleration.

According to the anti-lock brake system constituted of the above configuration, the third acceleration generated in the rotating-shaft direction is detected by the sensor unit, the detection result is converted into a digital value, and the digital information including the digital value of the third acceleration is transmitted to the monitor system.

Moreover, the detection result of the third acceleration is obtained by the monitor system and the brake driving actuator is driven by the driving means in accordance with the detection results of the first acceleration, second acceleration, and third acceleration.

In this case, the third acceleration is changed due to rolling of the rotating mechanism portion or movement in the horizontal direction, for example, due to rolling of the body of rotation or wheel or horizontal movement of a body of rotation or wheel by a steering wheel operation. Therefore, it is possible to detect rolling or horizontal movement of the rotating mechanism portion from the detection result of the third acceleration.

Moreover, the present invention provides an anti-lock brake system constituted of the above configuration, in which the sensor unit has means for detecting a change of the second acceleration, means for detecting a rotating speed per unit time in accordance with the change of the second acceleration, and means for converting the detected rotating speed into a digital value and transmitting the digital information including the digital value of the rotating speed to the monitor system and the monitor system has means for receiving the digital value of the rotating speed from the sensor unit, the driving means for driving the brake driving actuator in accordance with the detection results of the first acceleration, second acceleration, and third acceleration, and the detection result of the rotating speed.

According to the anti-lock brake system constituted of the above configuration, the change of the second acceleration is detected by the sensor unit, the rotating speed per unit time is detected in accordance with the change of the second acceleration, the detected rotating speed is converted into the digital value, and transmitted the digital information including the digital value of the rotating speed to the monitor system. Therefore, the monitor system does not have to detect the rotating speed in accordance with the change of the second acceleration.

Moreover, the present invention provides an anti-lock brake system constituted of the above configuration, in which the sensor unit is set to the body of rotation.

According to the anti-lock brake system constituted of the above configuration, it is possible to freely replace a wheel and tire because the sensor unit is set to the body of rotation provided for the vehicle body in order to mount a wheel.

Moreover, the present invention uses an anti-lock brake system constituted of the above configuration, in which the sensor unit has means for receiving electromagnetic waves of a first frequency, means for converting the energy of the received first-frequency electromagnetic waves into driving electric energy, and means to be operated by the electric energy to transmit the digital information by using second-frequency electromagnetic waves, the monitor system has means for radiating the first-frequency electromagnetic waves, means for receiving the second-frequency electromagnetic waves, and means for extracting the digital information from the received second-frequency electromagnetic waves.

According to the anti-lock brake system constituted of the above configuration, when the first-frequency electromagnetic waves are radiated from the monitor system to the sensor unit, the sensor unit receiving the first-frequency electromagnetic waves converts the energy of the received first-frequency electromagnetic waves into electric energy. Moreover, the sensor unit operates by the electric energy, detects each acceleration, converts the detection result into a digital value, and transmits the digital information including the digital value by using the second-frequency electromagnetic waves.

The second-frequency electromagnetic waves transmitted from the sensor unit are received by the monitor system and the digital value of the detection result of each acceleration is extracted from the received second-frequency electromagnetic waves. Therefore, it is not necessary to use a power supply for the sensor unit.

Moreover, the present invention provides an anti-lock brake system constituted of the above configuration, in which the first frequency is equal to the second frequency.

According to the anti-lock brake system constituted of the above configuration, the same frequency is used as the first frequency and second frequency and transmission and reception are performed through time sharing.

Moreover, the present invention provides an anti-lock brake system in which the sensor unit has storing means storing identification information specific to its own and means for transmitting the digital information including the identification information and the monitor system has means for identifying the rotating mechanism portion in accordance with the identification information.

According to the anti-lock brake system constituted of the above configuration, because identification information specific to a sensor unit stored in the storing means of each sensor unit is transmitted from the sensor unit together with the detection result, the monitor system can determine the digital information transmitted from the sensor unit of which rotating mechanism. Thereby, it is possible to determine the digital information transmitted from each of a plurality of sensor units of one monitor system.

Moreover, the present invention provides an anti-lock brake system which is constituted of the above configuration and provided with a semiconductor acceleration sensor having a silicon-piezo-type diaphragm for detecting accelerations in directions orthogonal to each other.

According to the anti-block brake system constituted of the above configuration, the sensor unit is provided with a semiconductor acceleration sensor having a silicon piezo-type diaphragm and detects the accelerations in directions orthogonal to each other.

Moreover, an anti-block brake system constituted of the above configuration is provided with a rotating-speed detecting mechanism set to the rotating mechanism portion to detect a first rotating speed per unit time according to the rotation of the wheel and transmit the detection result to the monitor system, in which the sensor unit has means for detecting a change of the second acceleration, means for a second rotating speed per unit time in accordance with the change of the second acceleration, and means for converting the detected second rotating speed into a digital value and transmitting the digital information including the digital value of the second rotating speed to the monitor system and the monitor system has means for receiving the detection result of the first rotating speed from the rotating-speed detecting mechanism, means for receiving the detection result of the second rotating speed from the sensor unit, and determining means for determining whether the first rotating speed is equal to the second rotating speed.

According to the anti-lock brake system constituted of the above configuration, the first rotating speed per unit time is detected by the rotating-speed detecting mechanism and the detection result is transmitted to the monitor system. The change of the second acceleration is detected by the sensor unit, the second rotating speed per unit time is detected in accordance with the change of the second acceleration, and the detected second acceleration is converted into a digital value and the digital value is included in the digital information and transmitted to the monitor system. Therefore, the monitor system does not have to detect the second rotating speed according to the change of the second acceleration.

Moreover, the digital signal of the first rotating speed is received by the monitor system, the digital value of the second rotating speed is received, and it is determined whether the first rotating speed is equal to the second rotating speed. Therefore, it is possible to confirm the reliability of the digital information serving as the basis of the second rotating speed transmitted by the sensor unit.

Furthermore, the present invention provides an anti-lock brake system constituted of the above configuration, in which the rotating-speed detecting mechanism is provided with a disk set to the body of rotation and having a plurality of concave and convex portions on its periphery and means for generating a magnetic field and detecting a voltage according to a change of the magnetic field.

According to the anti-lock brake system constituted of the above configuration, a pulsed voltage is detected which is generated when a plurality of concave and convex portions formed on the periphery of the disk cross a magnetic field according to rotation. Therefore, by counting the number of pulsed voltages detected in unit time, it is possible to calculate first running speed per unit time.

Moreover, the present invention provides an anti-lock brake system constituted of the above configuration, in which the rotating-speed detecting mechanism has means for converting the detection result of the first rotating speed into a digital signal, the monitor system has means for converting the digital value of the second rotating speed into a digital signal, and the determining means has means for determining whether the first rotating speed is equal to the second rotating speed in accordance with the digital signal of the first rotating speed and the digital signal of the second rotating speed.

According to the anti-lock brake system constituted of the above configuration, the detection result of the first rotating speed is converted into a digital signal, the digital value of the second rotating speed is converted into a digital signal by the monitor system, and it is determined whether the first rotating speed is equal to the second rotating speed in accordance with the digital signal of the first rotating speed and the digital signal of the second rotating speed. Therefore, it is possible to compare the digital signals each other and determination becomes easy.

Moreover, the present invention provides an anti-lock brake system constituted of the above configuration, in which the converting means multiplies the digital value of the second rotating speed by a predetermined value and converting the multiplication value into a digital signal having the period of the reciprocal of the multiplication value.

According to the anti-lock brake system constituted of the above configuration, the digital value of the second rotating speed is multiplied by a predetermined value and converted into a digital signal having the period of the reciprocal of the multiplication value. Therefore, the digital signal of the second rotating speed generates a predetermined number of vibrations per turn of a wheel.

Moreover, the present invention provides an anti-lock brake system constituted of the above configuration, in which the determining means has means for determining that the first rotating speed is equal to the second rotating speed when oscillations of the digital signal of the second rotating speed are generated for every predetermined multiple of the period of the digital signal of the first rotating speed.

According to the anti-lock brake system constituted of the above configuration, it is determined by the determining means that the first rotating speed is equal to the second rotating speed when oscillations of the digital signal of the second rotating speed are generated for every predetermined multiple of the period of the digital signal of the first rotating speed. Therefore, it is possible to assure the reliability of digital information serving as the basis of the second rotating speed transmitted by the sensor unit.

Moreover, the present invention provides an anti-lock brake system constituted of the above configuration, in which a rotating-speed detecting mechanism set to the rotating mechanism portion to detect first running speed per unit time according to the rotation of the wheel and transmit the detection result to the monitor system, the sensor unit has means for detecting a change of the first acceleration, means for detecting second running speed per unit time in accordance with the change of the first acceleration, and means for converting the detected second running speed into a digital value and transmitting the digital information including the digital value of the second running speed to the monitor system and the monitor system has means for receiving the detection result of the first running speed from the rotating-speed detecting mechanism, means for receiving the detection result of the second running speed from the sensor unit, and determining means for determining whether the first running speed is equal to the second running speed.

According to the anti-lock brake system constituted of the above configuration, the first running speed per unit time is detected by the rotating-speed detecting mechanism and the detection result is transmitted to the monitor system. The change of the first acceleration is detected by the sensor unit, the second running speed per unit time is detected in accordance with the change of the first acceleration, and the detected second running speed is converted into a digital value, included in the digital information, and transmitted to the monitor system. Therefore, the monitor system does not have to detect the second running speed in accordance with the change of the fist acceleration.

Moreover, the present invention provides an anti-lock brake system constituted of the above configuration, in which the rotating-speed detecting mechanism is set to the body of rotation and the periphery of the mechanism is provided with a disk having a plurality of concave and convex portions at equal intervals and means for generating a magnetic field and detecting a voltage according to the change of the magnetic field.

According to the anti-lock brake system constituted of the above configuration, a pulsed voltage is detected which is generated when a plurality of concave and convex portions formed on the periphery of the disk cross a magnetic field in accordance with rotation. Therefore, by counting the number of pulsed voltages detected in unit time, it is possible to calculate the first running speed per unit time.

Moreover, the digital signal of the first running speed and the digital value of the second running speed are received and it is determined whether the first running speed is equal to the second running speed by the monitor system. Therefore, it is possible to confirm the reliability of the digital information serving as the basis of the second running speed transmitted by the sensor unit.

Moreover, the present invention provides an anti-lock brake system constituted of the above configuration, in which the rotating-speed detecting mechanism has means for converting the detection result of the first running speed into a digital signal, the monitor system has converting means for converting the digital value of the second running speed into a digital signal, the determining means has means for determining whether the first running speed is equal to the second running speed in accordance with the digital signal of the first running speed and the digital signal of the second running speed.

According to the anti-lock brake system constituted of the above configuration, the detection result of the first running speed is converted into a digital signal by the rotating-speed detecting mechanism, the digital value of the second running speed is converted into a digital signal by the monitor system, and it is determined whether the first running speed is equal to the second running speed in accordance with the digital signal of the first running speed and the digital signal of the second running speed. Therefore, it is possible to compare the digital signals each other and determination becomes easy.

Moreover, the present invention provides an anti-lock brake system constituted of the above configuration, in which the converting means has means for multiplying the digital value of the second running speed by a predetermined value and converting the multiplication value into a digital signal having the period of the reciprocal of the multiplication value.

According to the anti-lock brake system constituted of the above configuration, the digital value of the second running speed is multiplied by a predetermined value by the converting means and converted into a digital signal having the period of the reciprocal of the multiplication value. Therefore, the digital signal of the second running speed causes oscillations of a predetermined value per turn of a wheel.

Moreover, the present invention provides an anti-lock brake system constituted of the above configuration, in which the determining means has means for determining that the first running speed is equal to the second running speed when oscillations of the digital signal of the second running speed are generated for every predetermined multiple of the period of the digital signal of the first running speed.

According to the anti-lock brake system constituted of the above configuration, it is determined that the first running speed is equal to the second running speed when oscillations of the digital signal of the second running speed are generated for every predetermined multiple of the period of the digital signal of the first running speed. Therefore, it is possible to assure the reliability of the digital information serving as the basis of the second running speed transmitted by the sensor unit.

Moreover, to achieve the above object, the present invention provides a sensor unit set to a rotating mechanism portion including a body of rotation set to the vehicle body side to fix and rotate a wheel and detect acceleration generated in accordance with rotation, which has means for detecting first acceleration generated in the direction orthogonal to a rotating shaft in accordance with rotation and second acceleration generated in a rotating direction, means for converting the detection result of the first acceleration and the detection result of the second acceleration into digital values, and means for transmitting the digital information including the digital value.

According to the sensor unit constituted of the above configuration, the first acceleration generated in the direction orthogonal to the rotating shaft in accordance with rotation and the second acceleration generate in the rotating direction are detected, the detection results are converted into digital values, and the digital information including the digital values is transmitted.

In this case, because a centrifugal force increases as the rotating speed of the rotating mechanism portion increases, the first acceleration increases as the rotating speed increases. Moreover, because the position of the sensor unit moves in accordance with the rotating speed and direction of gravitational acceleration applied to the sensor unit changes, the magnitude of the second acceleration fluctuates like a sine waveform in accordance with rotation in the sensor unit and the period of the fluctuation becomes shorter as the rotating speed increases. Therefore, it is possible to obtain the speed of a vehicle from the detection result of the first acceleration and obtain the rotating speed per unit time of a wheel from the detection result of the second acceleration.

Moreover, the present invention provides a sensor unit constituted of the above configuration, which has means for detecting third acceleration generated in the direction of the rotating shaft, means for converting the detection result of the third acceleration into a digital value, and means for transmitting the digital information including the digital value of the third acceleration.

According to the sensor unit constituted of the above configuration, the third acceleration generated in the direction of the rotating shaft is detected and the detection result is converted into a digital value, included in digital information, and transmitted.

In this case, the third acceleration is changed due to rolling of the rotating mechanism portion or movement in the horizontal direction, for example, due to rolling of the body of rotation or wheel or horizontal movement of the body of rotation or wheel by a steering wheel operation. Therefore, it is possible to detect rolling or horizontal movement of the rotating mechanism portion from the detection result of the third acceleration.

Moreover, the present invention provides a sensor unit constituted of the above configuration, having means for detecting a change of the second acceleration, means for detecting the rotating speed per unit time in accordance with the change of the second acceleration, and means for transmitting the digital information including the digital value of the rotating speed.

According to the sensor unit constituted of the above configuration, the change of the second acceleration is detected, the rotating speed per unit time is detected in accordance with the change of the second acceleration, and the detected rotating speed is converted into a digital value, included in digital information, and transmitted.

Moreover, the present invention provides a sensor unit constituted of the above configuration, having means for receiving electromagnetic waves of a first frequency, means for converting the energy of the electromagnetic waves of the received first frequency into electric energy for driving, and means for transmitting the digital information by using the electromagnetic waves of a second frequency.

According to the sensor unit constituted of the above configuration, when the electromagnetic waves of the first frequency is radiated to the sensor unit from the outside, the sensor unit receiving the electromagnetic waves of the first frequency converts the energy of the electromagnetic waves of the received first frequency into electric energy. Moreover, the sensor unit is operated by the electric energy, detects each acceleration, converts the detection result into a digital value, and transmits the digital information including the digital value by using the electromagnetic waves of the second frequency. Therefore, it is not necessary to use a power supply for the sensor unit.

Moreover, the present invention provides a sensor unit constituted of the above configuration, in which the first frequency is equal to the second frequency.

According to the sensor unit constituted of the above configuration, the same frequency is used as the first frequency and second frequency and transmission/reception can be performed through time-sharing.

Moreover, the present invention provides a sensor unit constituted of the above configuration, having storing means for storing the identification information specific to its own and means for transmitting digital information including the identification information.

According to the sensor unit constituted of the above configuration, because the identification information specific to the sensor unit stored in the storing means is transmitted from the sensor unit together with the detection result, the receiving side can determine the digital information transmitted from the sensor unit of which rotating mechanism portion in accordance with the identification information received from the sensor unit. Thereby, it is possible to determine the digital information transmitted from each of a plurality of sensor units.

Moreover, the present invention provides a sensor unit constituted of the above configuration, having a semiconductor acceleration sensor having a silicon piezo-type diaphragm for detecting accelerations orthogonal to each other.

The sensor unit constituted of the above configuration has a semiconductor acceleration sensor having a silicon piezo-type diaphragm and detects the accelerations orthogonal to each other by the semiconductor acceleration sensor.

Advantages of the Invention

According to an anti-lock brake system of the present invention, it is possible to detect the acceleration generated by rotation of a wheel or the like at a rotating mechanism portion.

Therefore, by using the acceleration for driving control of a vehicle, it is possible to perform proper control particularly in braking control. Moreover, it is possible to specify the deflection of a tire, side slip of a vehicle body, idle running of a wheel. Therefore, by using them for braking control of a vehicle, it is possible to perform higher-accuracy control. Furthermore, by using a conventional rotating-speed detecting mechanism and thereby confirming the rotating speed and running speed according to the acceleration, it is possible to assure the reliability of the acceleration.

According to a sensor unit of the present invention, only by setting the sensor unit to a predetermined position of a body of rotation such as a wheel or axle of a rim, wheel, or tire body, it is possible to easily detect the acceleration generated by the rotation of the wheel.

The above object, configuration, features, and functions and advantages of the present invention will become more apparent by the following description and accompanying drawings.

BRIEFLY DESCRIBE OF THE DRAWINGS

FIG. 10 is a block diagram showing an electric circuit of the semiconductor acceleration sensor of the first embodiment of the present invention;

FIG. 11 is an illustration showing a bridge circuit for detecting the X-axis-directional acceleration using the semiconductor acceleration sensor of the first embodiment of the present invention;

FIG. 12 is an illustration showing a bridge circuit for detecting the Y-axis-directional acceleration using the semiconductor acceleration sensor of the first embodiment of the present invention;

FIG. 13 is an illustration showing a bridge circuit for detecting Z-axis-directional acceleration using the semiconductor acceleration sensor of the first embodiment of the present invention;

FIG. 18 is an illustration showing a measured result of the Z-axis-directional acceleration of the first embodiment of the present invention;

FIG. 19 is an illustration showing a measured result of the Z-axis-directional acceleration of the first embodiment of the present invention;

FIG. 24 is an illustration showing a measured result of the Y-axis-directional acceleration of the first embodiment of the present invention;

FIG. 25 is an illustration showing a measured result of the Y-axis-directional acceleration of the first embodiment of the present invention;

FIG. 26 is an illustration showing a measured result of the X-axis-directional acceleration when applying a brake in the first embodiment of the present invention;

FIG. 27 is an illustration showing a measured result of the Z-axis-directional acceleration when applying a brake in the first embodiment of the present invention;

Figure 35:
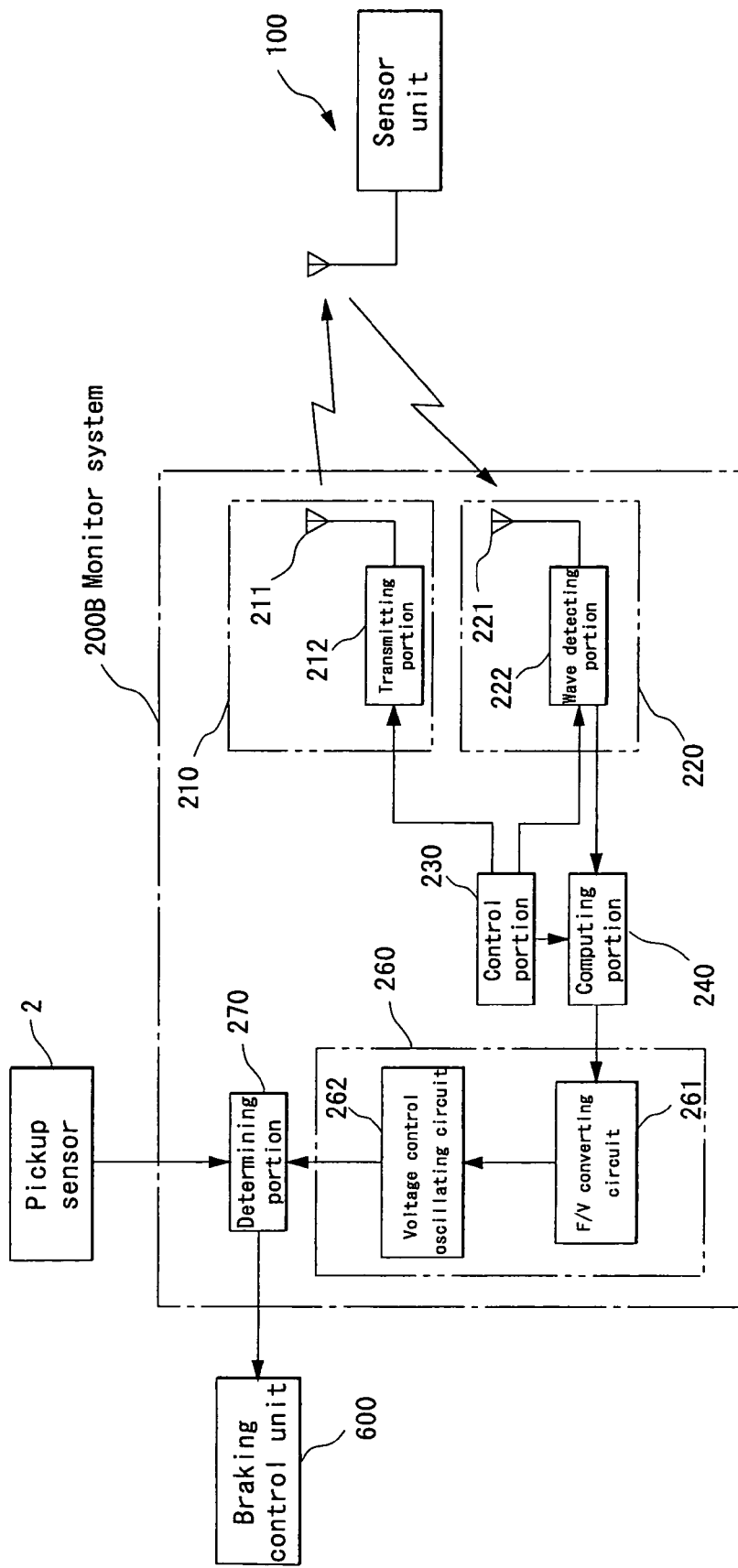
Figure 36:
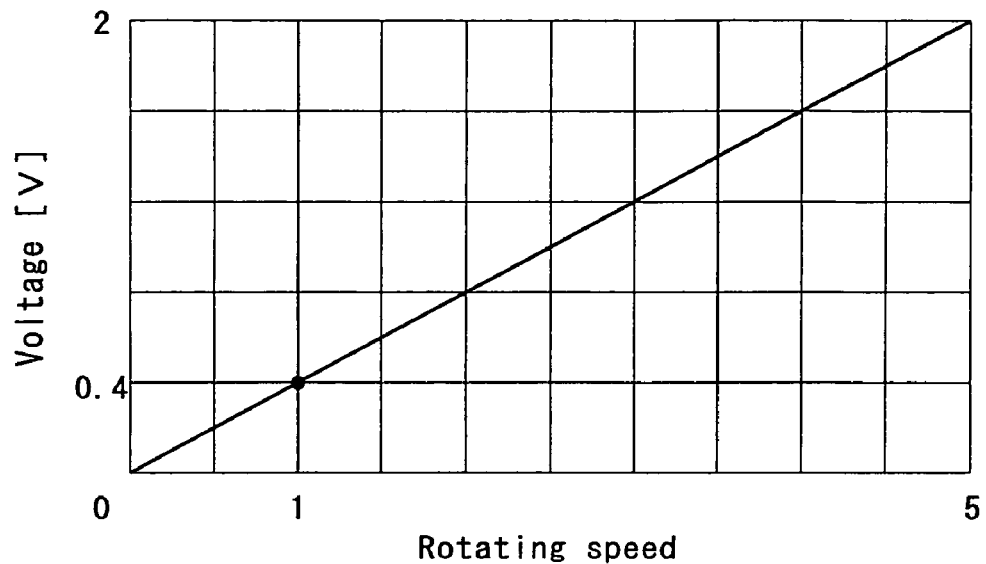
Figure 37:
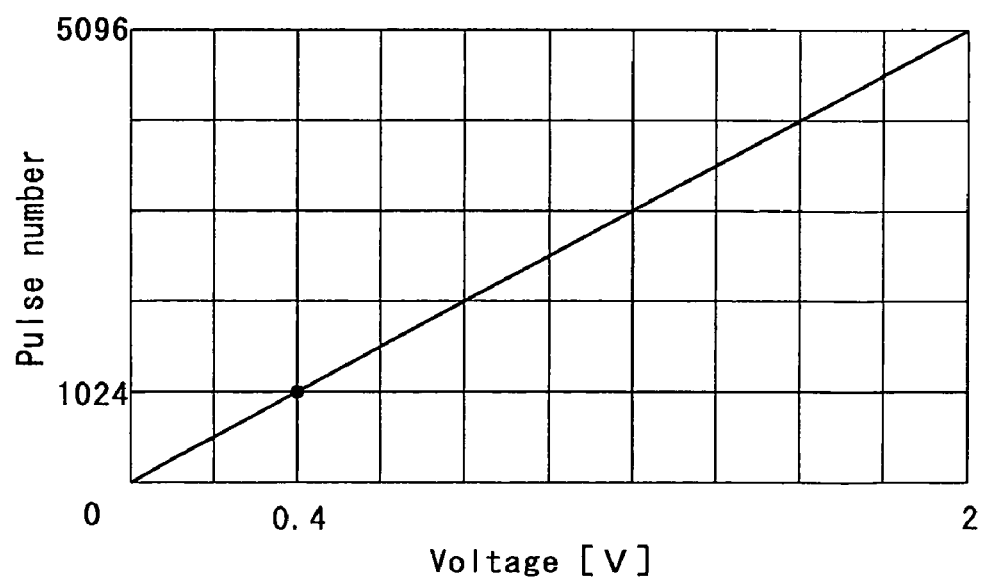
Figure 38:
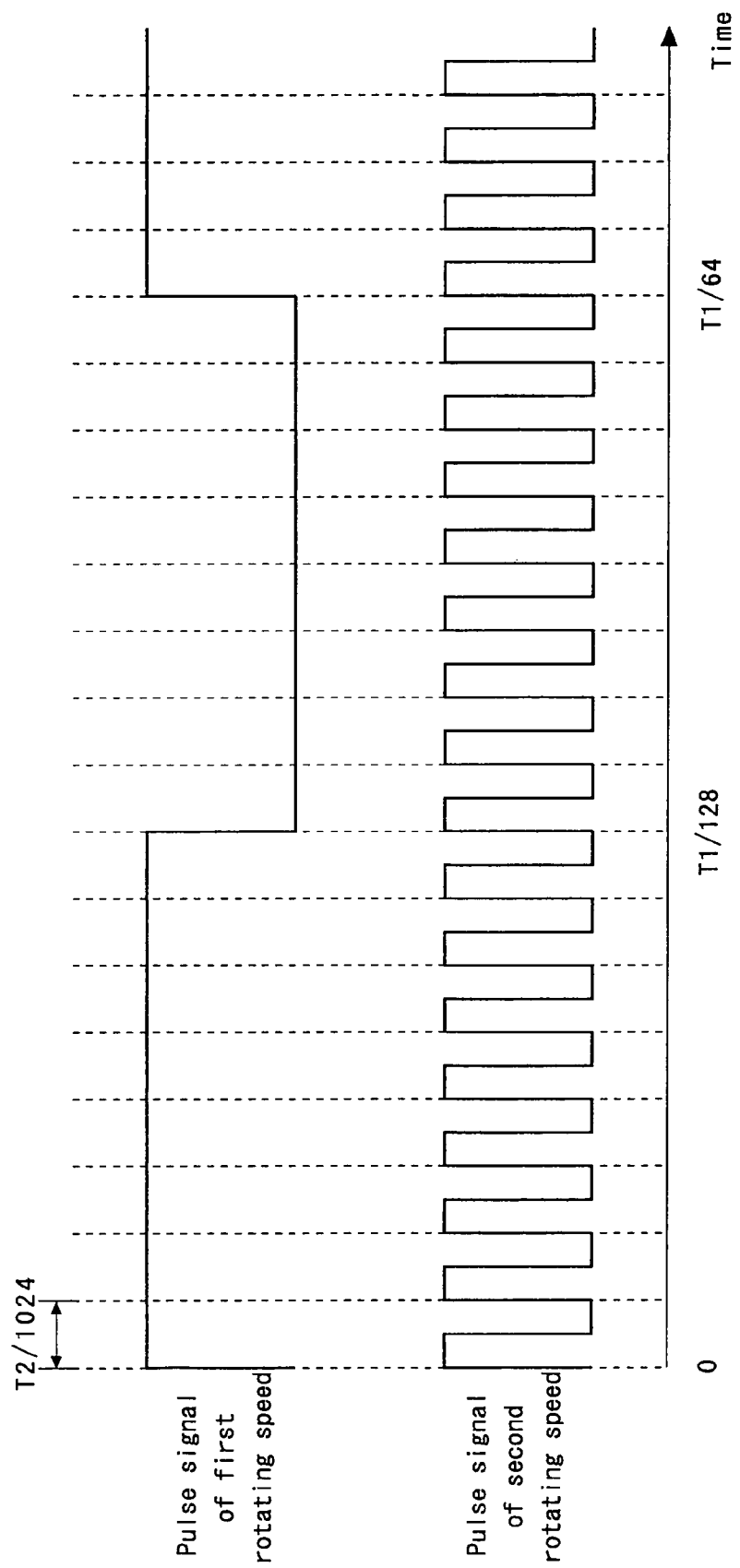
Figure 39:
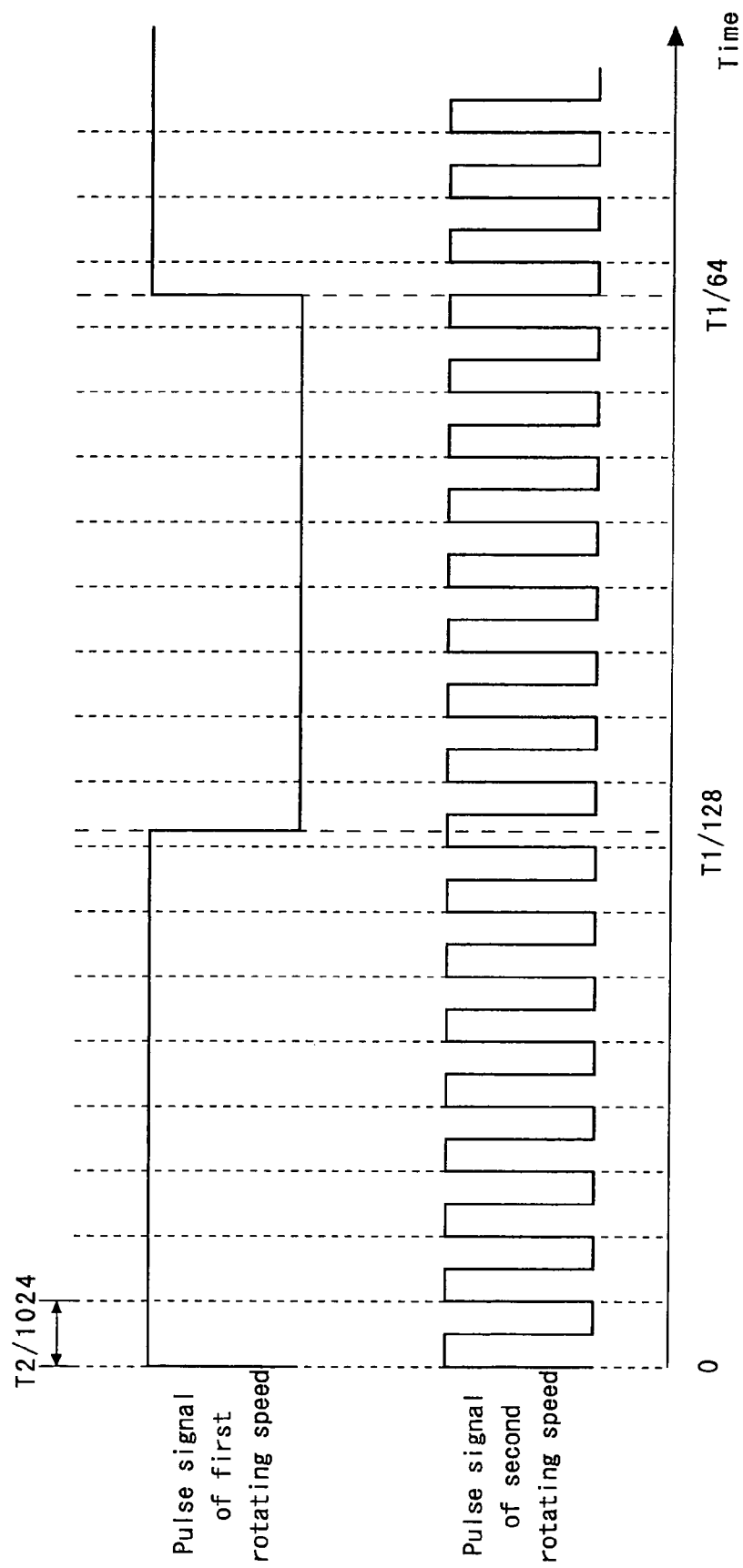
Figure 40:
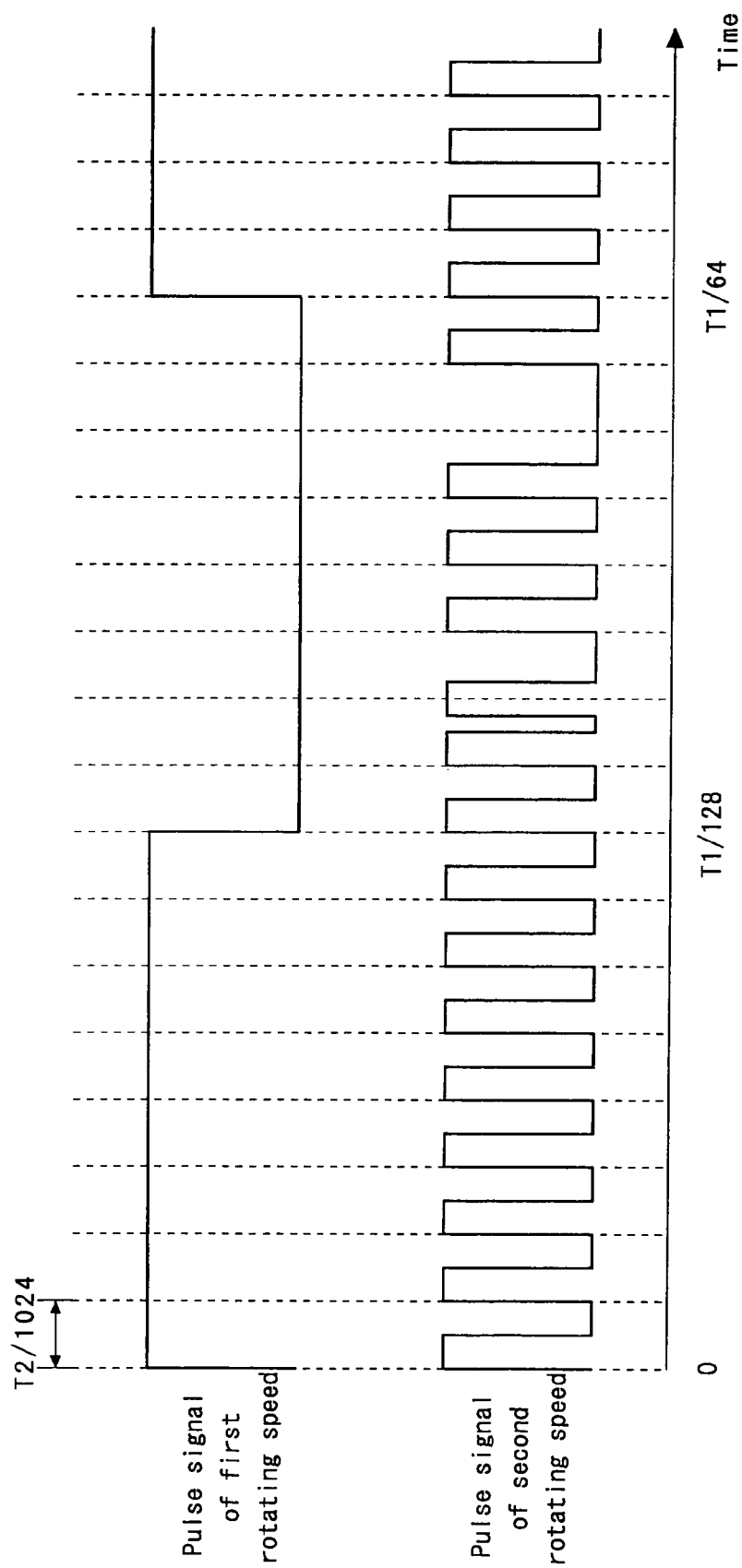
Figure 41:
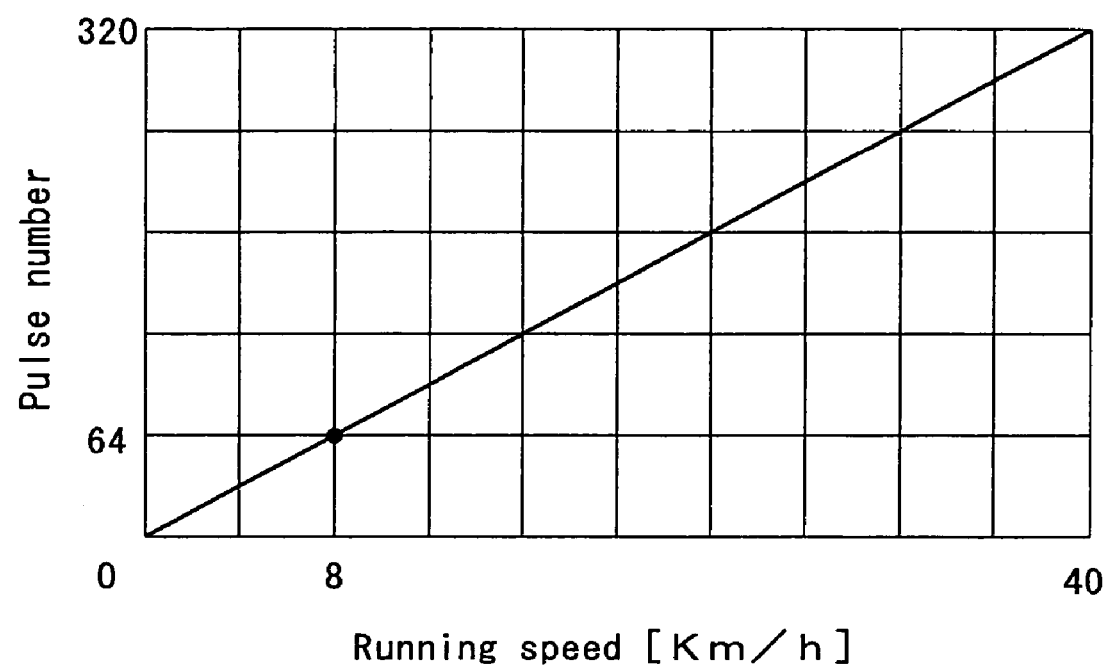
Figure 42:
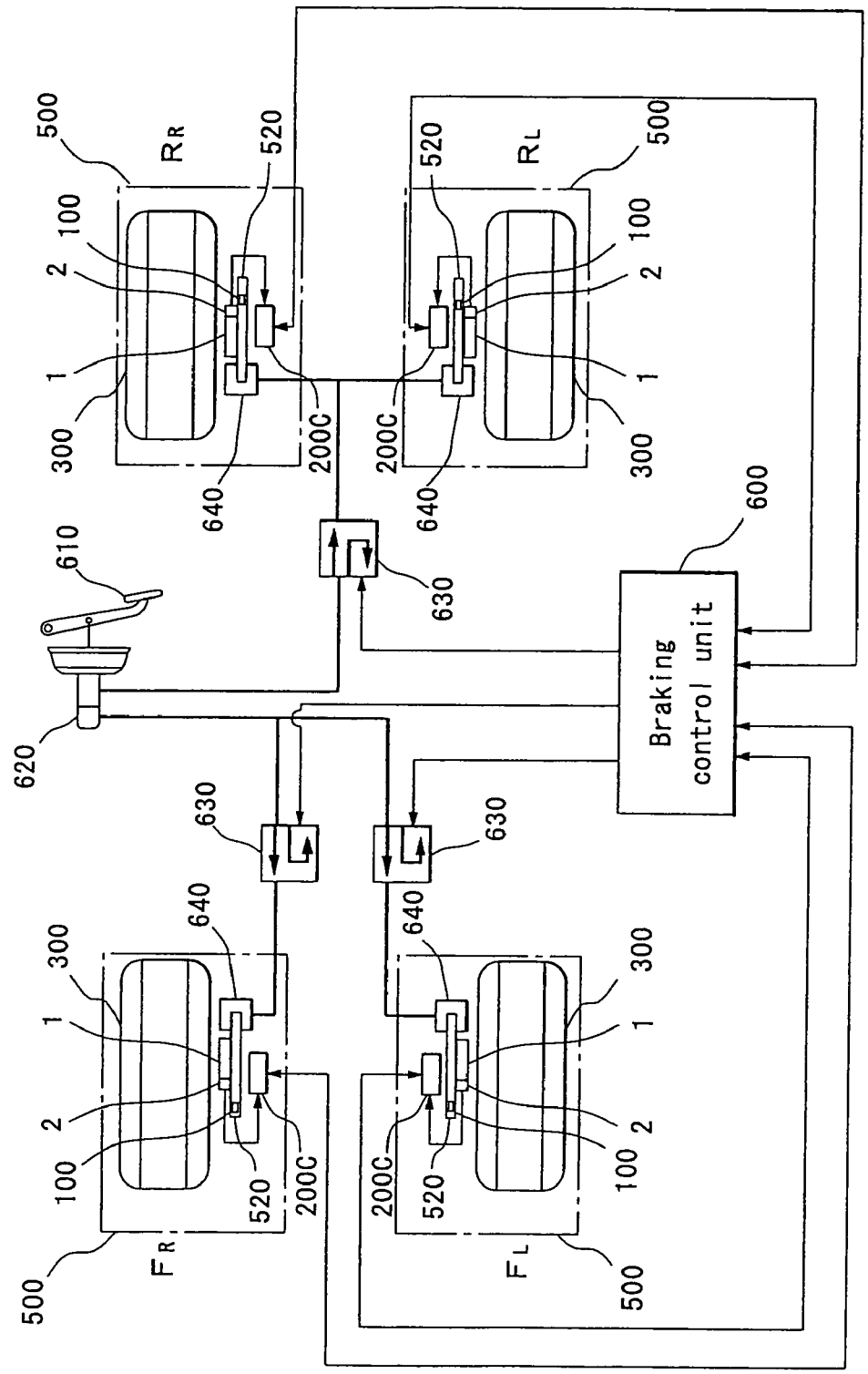
Figure 43:
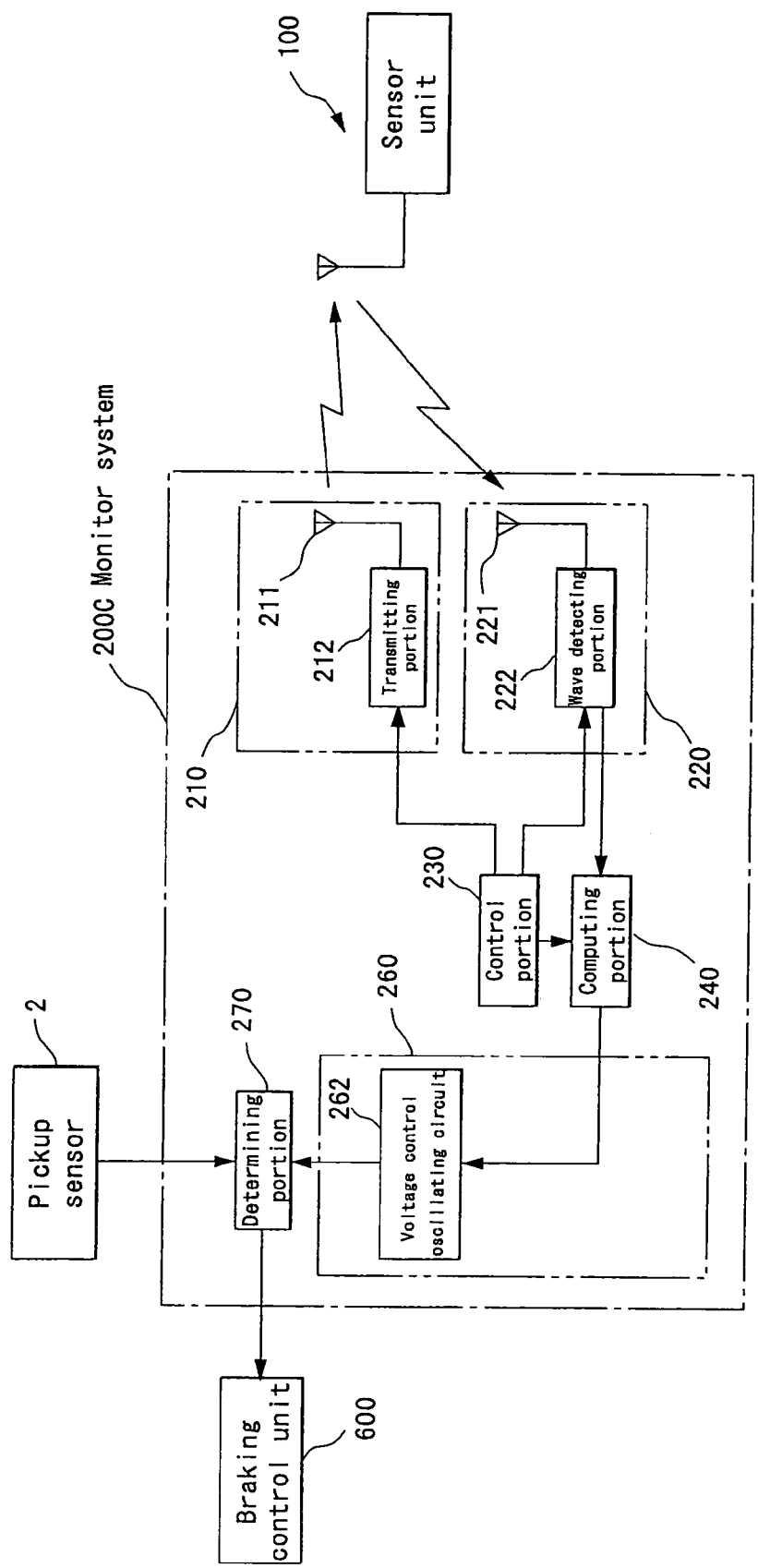
Figure 44:
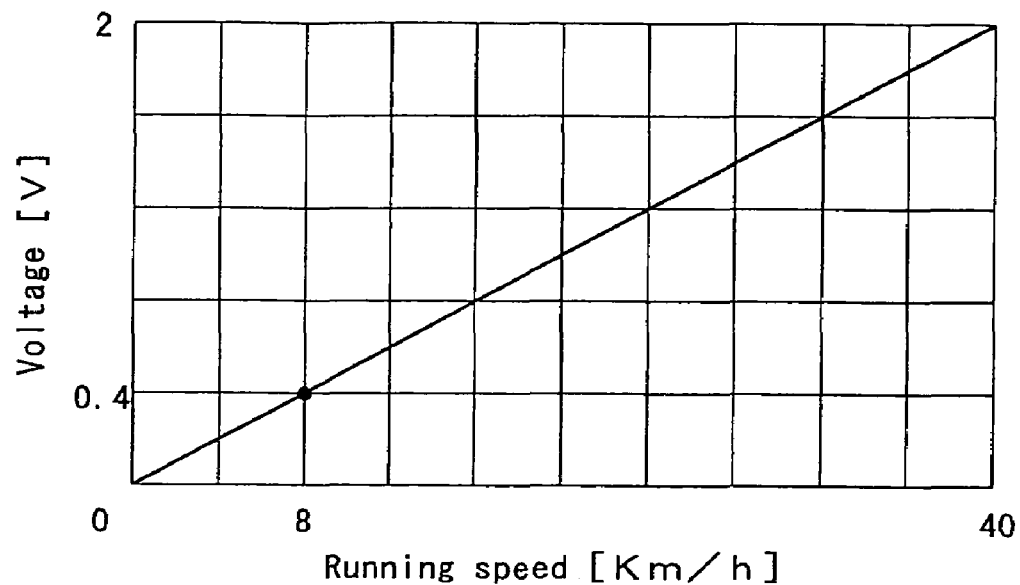
Figure 45:
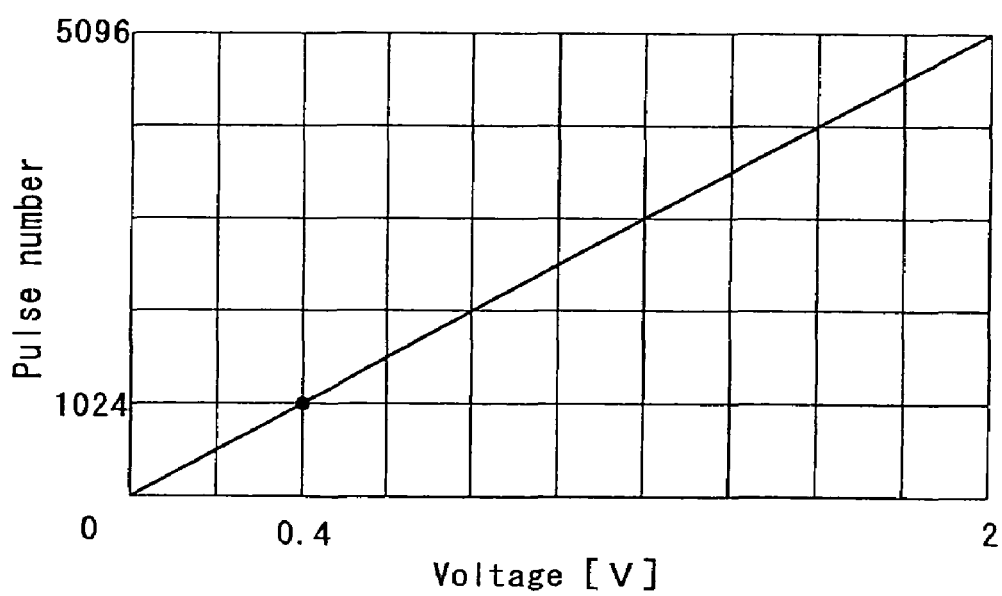

FIG. 35 a block diagram showing an electric circuit of a monitor system of the third embodiment of the present invention;

FIG. 36 is an illustration showing a relation between second rotating speed and output voltage in the third embodiment of the present invention;

FIG. 37 is an illustration showing a relation between output voltage and pulse number in the third embodiment of the present invention;

FIG. 38 is an illustration for explaining a relation between pulse signal of first rotating speed and pulse signal of second rotating speed in the third embodiment of the present invention;

FIG. 39 is an illustration for explaining a relation between pulse signal of first rotating speed and pulse signal of second rotating speed in the third embodiment of the present invention;

FIG. 40 is an illustration for explaining a relation between pulse signal of first rotating speed and pulse signal of second rotating speed;

FIG. 41 is an illustration showing a relation between first running speed and pulse number in fourth embodiment of the present invention;

FIG. 42 is a schematic block diagram showing a vehicle braking control unit of the fourth embodiment of the present invention;

FIG. 43 is a block diagram showing an electric circuit of a monitor system of the fourth embodiment of the present invention;

FIG. 44 is an illustration showing a relation between second running speed and output voltage in the fourth embodiment of the present invention; and FIG. 45 is an illustration showing a relation between output voltage and pulse number in the fourth embodiment of the present invention.

DESCRIPTION OF SYMBOLS

1 . . . Rotor, 2 . . . Pickup sensor, 100, 100A . . . Sensor unit, 110 . . . Antenna, 120 . . . Antenna switching unit, 130 . . . Rectifying circuit, 131, 132 . . . Diode, 133 . . . Capacitor, 134 . . . Resistor, 140 . . . Central processing portion, 141 . . . CPU, 142 . . . D/A converting circuit, 143 . . . Storing portion, 150 . . . Wave detecting portion, 151 . . . Diode, 152 . . . A/D converting circuit, 160 . . . Transmitting portion, 161 . . . Oscillating circuit, 162 . . . Modulating circuit, 163 . . . High-frequency amplifying circuit, 170 . . . Sensor portion, 171 . . . Acceleration sensor, 172 . . . A/D converting circuit, 173 . . . Pressure sensor, 174 . . . A/D converting circuit, 200, 200A, 200B, 200C . . . Monitor system, 210 . . . Radiating unit, 211 . . . Antenna, 212 . . . Transmitting portion, 220 . . . Wave receiving unit, 221 . . . Antenna, 222 . . . Wave detecting portion, 230 . . . Control portion, 240 . . . Computing portion, 250 . . . Operating portion, 260 . . . Converting portion, 261 . . . F/V converting circuit, 262 . . . Voltage control oscillating circuit, 270 . . . Determining portion, 300 . . . Tire, 301 . . . Cap tread, 302 . . . Under tread, 303A, 303B . . . Belt, 304 . . . Carcass, 305 . . . Tire body, 306 . . . Rim, 400 . . . Tire house, 500 . . . Rotating mechanism portion, 510 . . . Wheel, 520 . . . Brake disk, 530 . . . Wheel carrier, 600, 600A . . . Braking control unit, 610 . . . Brake pedal, 620 . . . Master cylinder, 630 . . . Pressure control valve, 640 . . . Brake driving actuator, 10 . . . Semiconductor acceleration sensor, 11 . . . Pedestal, 12 . . . Silicon substrate, 13 . . . Diaphragm, 13a-13d . . . Diaphragm piece, 14 . . . Thick film portion, 15 . . . Heavy spindle, 18A, 18B . . . Support medium, 181 . . . Outer frame portion, 182 . . . Support, 183 . . . Beam portion, 184 . . . Protruding portion, 184a . . . Protruding portion apex, 31A to 31C . . . Voltage detector, 32A to 32C . . . DC power supply, Rx1-Rx4, Ry1-Ry4, Rz1-Rz4 . . . Piezo-resistance element (Diffusion resistor)

BEST MODE FOR CARRYING OUT THE INVENTION

An anti-lock brake system of an embodiment of the present invention is described below by referring to the accompanying drawings.

Figure 1:
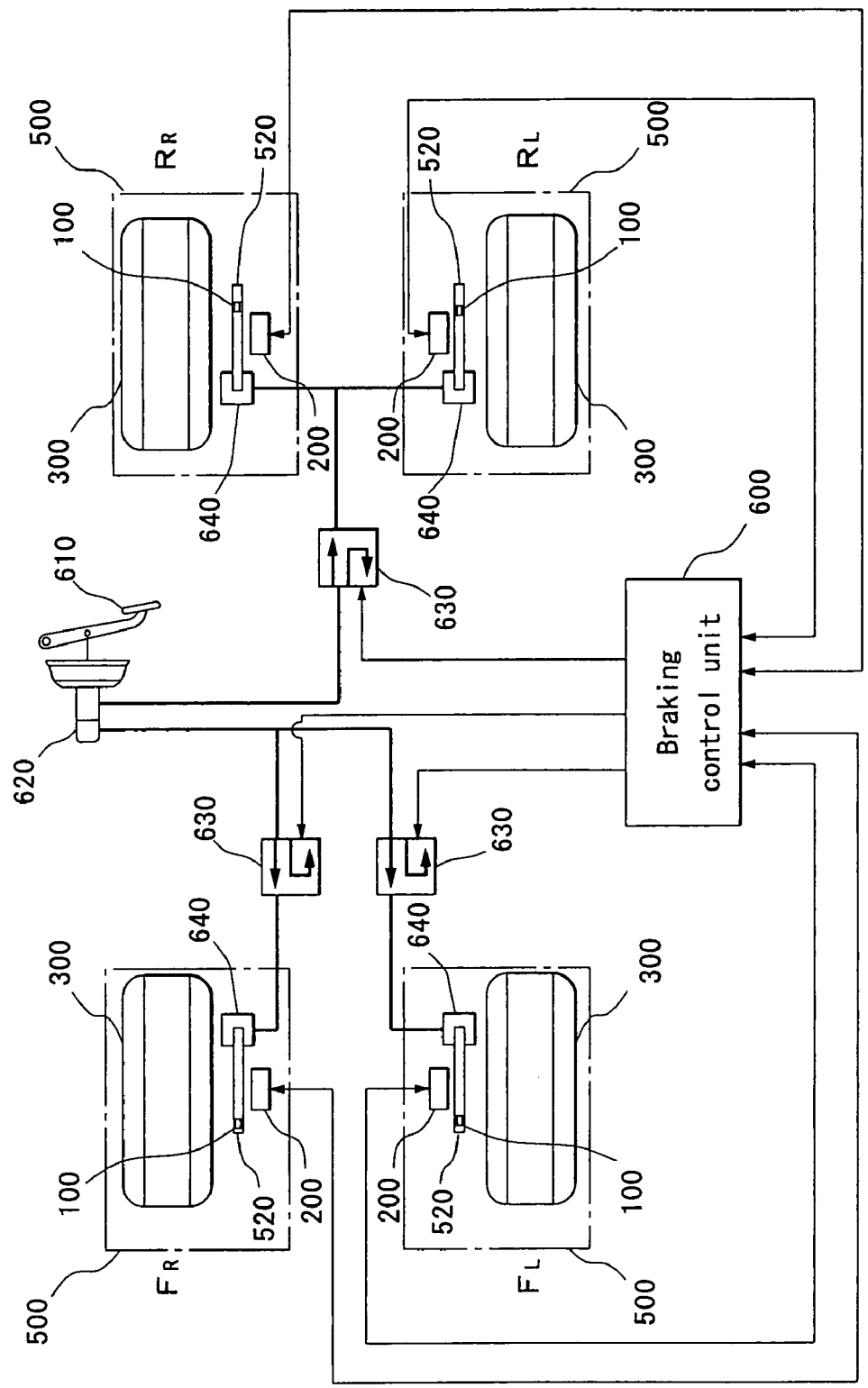
FIG. 1 is a schematic block diagram showing a vehicle braking control unit of an anti-lock brake system of first embodiment of the present invention.

FIG. 1 is a schematic block diagram showing a four-wheel vehicle braking control unit of the anti-lock brake system of the first embodiment of the present invention. In FIG. 1, reference numeral 100 denotes a sensor unit, 200 denotes a monitor system, 300 denotes a tire, 500 denotes a rotating mechanism portion, 600 denotes a braking control unit, 610 denotes a brake pedal, 620 denotes a brake master cylinder, 630 denotes a pressure control valve for controlling brake hydraulic pressure, and 640 denotes a brake-driving actuator.

In the case of this embodiment, a tire state detector of the present invention is constituted of a plurality of sensor units 100 and a plurality of monitor systems 200.

Figure 2:
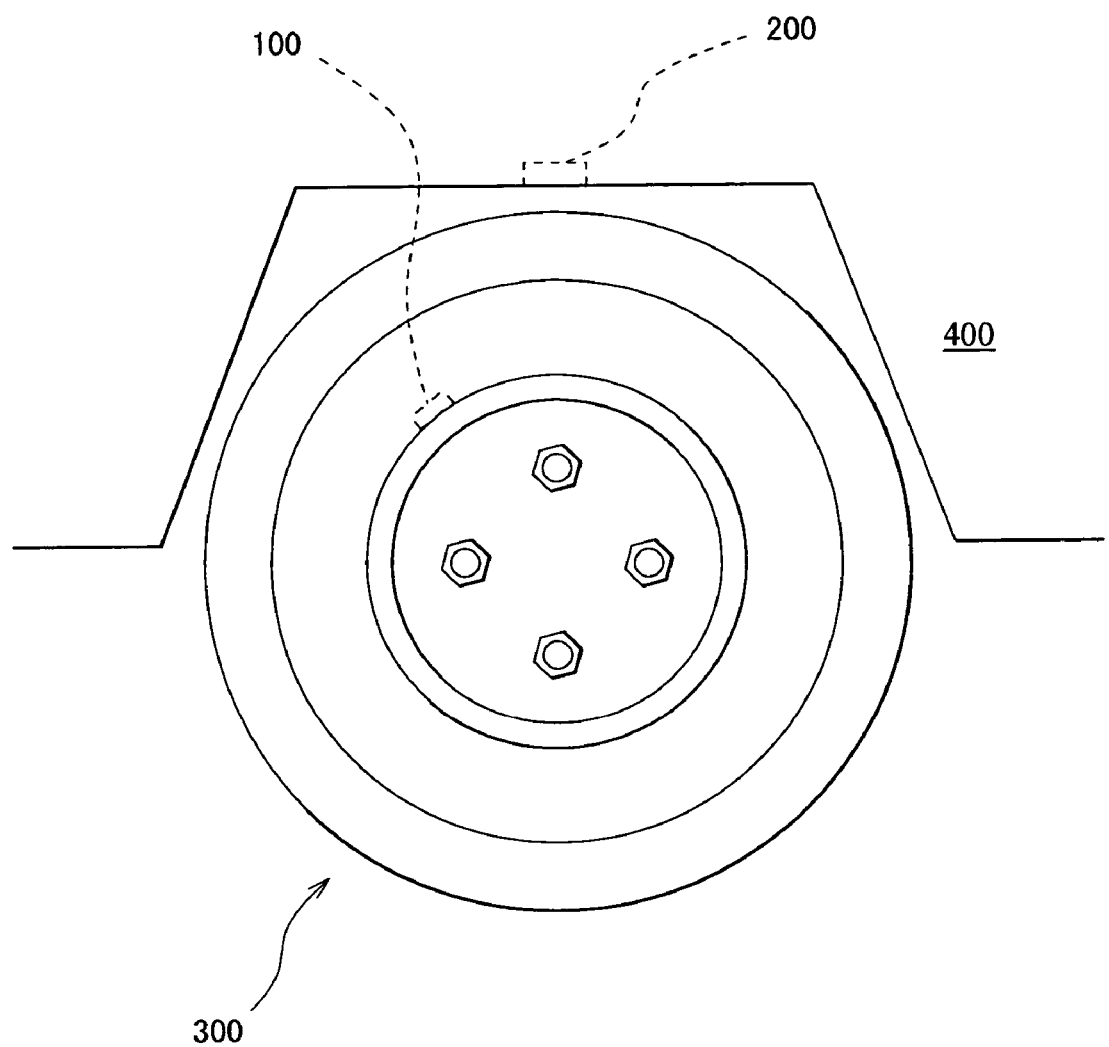
FIG. 2 is an illustration for explaining a set state of a sensor unit and a monitor system of the first embodiment of the present invention.

As shown in FIG. 2, the sensor unit 100 is fixed in each tire 300 of a vehicle and moreover, the monitor system 200 is fixed to the tire house 400 of the tire 300.

Figure 3:
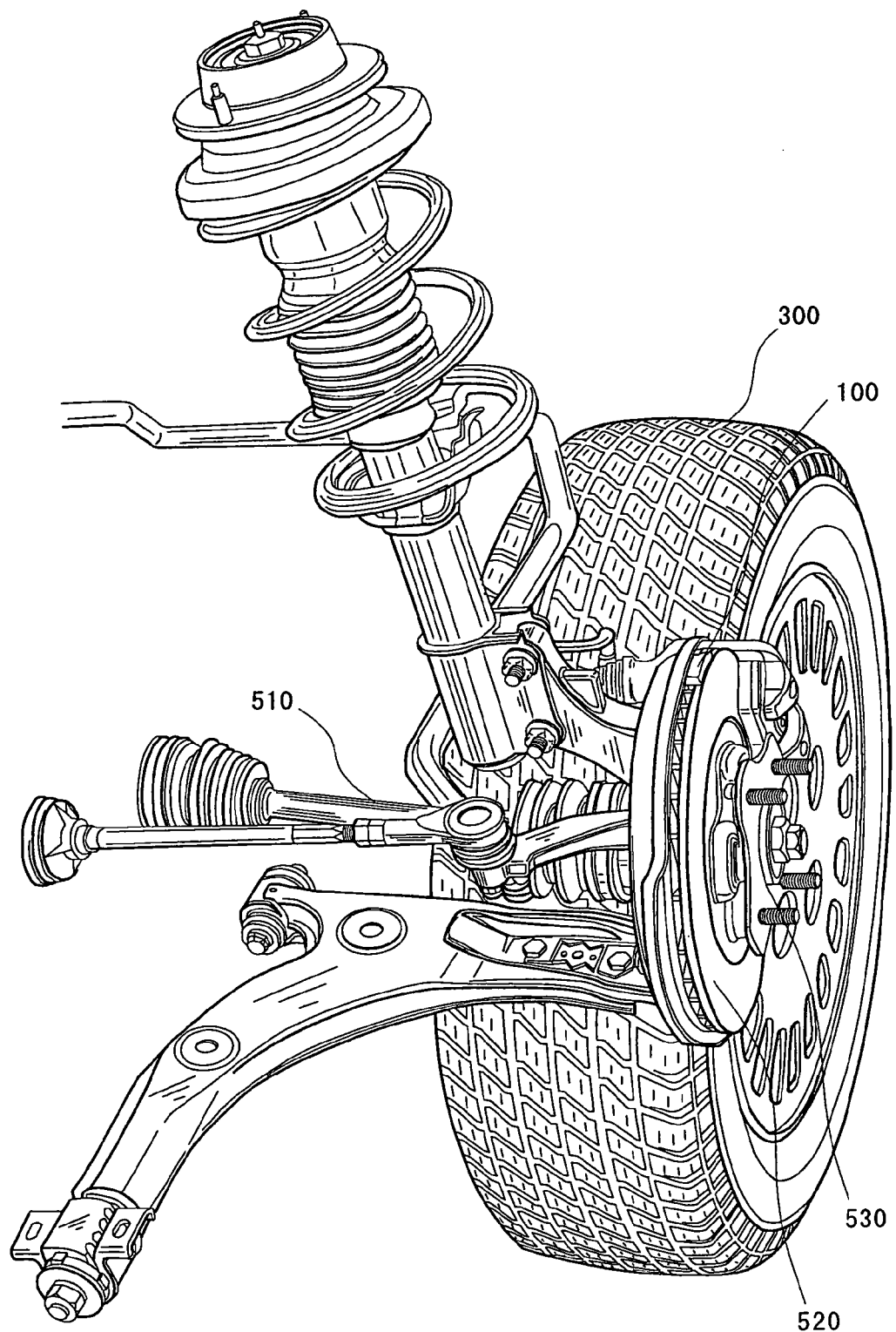
FIG. 3 is an illustration for explaining a set state of the sensor unit of the first embodiment of the present invention.

As shown in FIG. 3, the rotating mechanism portion 500 includes a brake disk 520, wheel carrier 530 for fixing a tire 300, and body of rotation such as a tire body and rim in the tire 300.

Moreover, the braking control unit 600 is constituted of a control circuit having a widely-known CPU, which captures a detection result output from the monitor system 200 to perform braking control.

That is, by stepping on the brake pedal 610, the hydraulic pressure in the master cylinder 620 rises and is transferred to the brake-driving actuator 640 of each tire 300 through a pressure control valve and thereby, a braking force is added to rotation of each timer 300.

The braking control unit 600 automatically controls the tire 300 so that slip does not occur when the tire 300 is locked by electrically controlling an operation state of each pressure control vale 630. The braking control unit 600 electrically controls the operation state of each pressure control vale 630 in accordance with a detection result output from the monitor system 200.

For example, as shown in FIGS. 2 and 3, the sensor unit 100 is fixed to a predetermined position of the brake disk 520 to be rotated together with the tire 300 to detect accelerations in three directions orthogonal to each other generated due to rotation of the tire 300 by an acceleration sensor to be described later set in the sensor unit 100 and convert the detected accelerations into digital values. Moreover, the sensor unit 100 generates and transmits the digital information including digital values of the accelerations of detection results.

Figure 4:
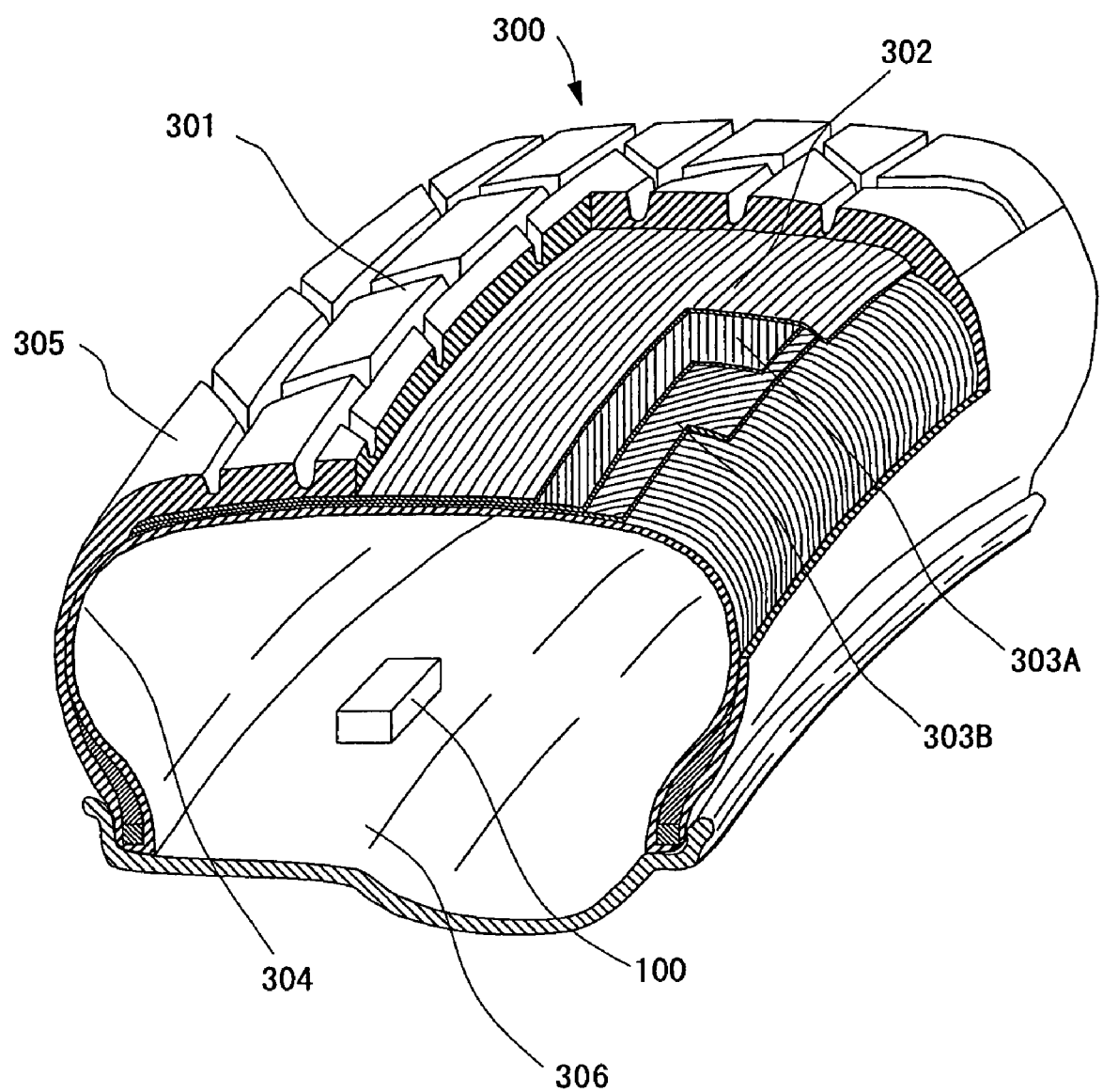
FIG. 4 is an illustration for explaining another set state of the sensor unit of the first embodiment of the present invention.

In the case of this embodiment, the sensor unit 100 is fixed to the brake disk 520. However, as shown in FIG. 4, it is also allowed to fix the rim 306. In FIG. 4, the tire 300 is, for example, a widely known tubeless radial tire which includes a wheel and rim in the case of this embodiment. In FIG. 3, reference numeral 300 denotes a tire which is constituted of the tire body 305, rim 306, and wheel (not illustrated) and the tire body 305 is constituted of the widely known cap tread 301, under tread 302, belts 303A and 303B, and carcass 304, and so on.

Moreover, the number of sensor units 100 to be set to each rotating mechanism portion 500 is not restricted to one but it is allowed to set two or more sensor units as auxiliary ones.

Figure 5:
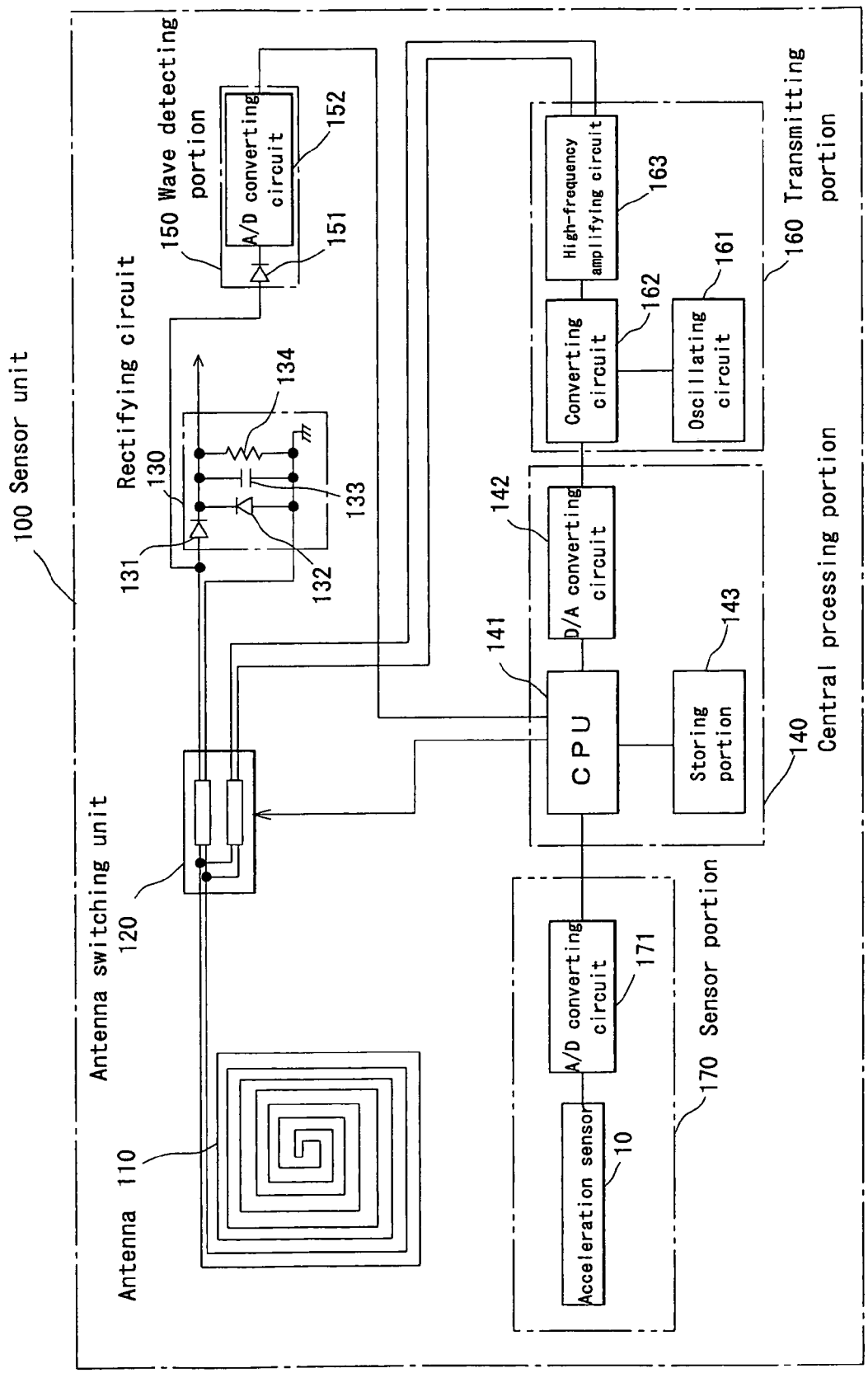
FIG. 5 is a block diagram showing an electric circuit of the sensor unit of the first embodiment of the present invention.

As a specific example of an electric circuit of the sensor unit 100, the circuit shown in FIG. 5 is used. That is, the specific example of the sensor unit 100 shown in FIG. 5 is constituted of an antenna 110, antenna switching unit 120, rectifying circuit 130, central processing portion 140, wave detecting portion 150, transmitting portion 160, and sensor portion 170.

The antenna 110 is used to perform communication with the monitor system 200 by using electromagnetic waves. For example, the antenna 110 is matched with a predetermined frequency (first frequency) in 2.4 GHz band.

The antenna switching unit 120 is constituted of, for example, an electronic switch to switch the connection between the antenna 110, rectifying circuit 130, and wave detecting portion 150 and the connection between the antenna 110 and transmitting portion 160.

The rectifying circuit 130 is constituted of diodes 131 and 132, capacitor 133, and resistor 134 to form a widely known full-wave rectifying circuit. The antenna 110 is connected to the input side of the rectifying circuit 130 through the antenna-switching unit 120. The rectifying circuit 130 rectifies the high-frequency current induced in the antenna 110, converts the current into DC, and outputs the DC as driving power supplies of the central processing portion 140, wave detecting portion 150, transmitting portion 160, and sensor portion 170.

The central processing portion 140 is constituted of the widely known CPU 141, digital/analog (hereafter referred to as D/A) converting circuit 142, and storing portion 143.

The CPU 141 operates in accordance with a program stored in a semiconductor memory of the storing portion 143, generates the digital value of the acceleration detection result obtained from the sensor portion 170 and the digital information including identification information to be described later, and transmits the digital information to the monitor system 200. Moreover, the above identification information specific to the sensor unit 100 is previously stored in the storing portion 143.

The storing portion 143 is constituted of a ROM in which a program for operating the CPU 141 is stored and a nonvolatile semiconductor memory to be electrically rewritten such as an EEPROM (electrically erasable programmable read-only memory) and the above identification information specific to each sensor unit 100 is previously stored in a region specified as a region which cannot be rewritten in the storing portion 143 when fabricated.

The wave detecting portion 150 is constituted of a diode 151 and an A/D converter 152, in which the anode of the diode 151 is connected to the antenna 110 and the cathode of it is connected to the CPU 141 of the central processing portion 140 through the A/D converter 152. Thereby, electromagnetic waves received by the antenna 110 are wave-detected by the wave detecting portion 150 and signals obtained through wave detection are converted into digital signals and input to the CPU 141.

The transmitting portion 160 is constituted of an oscillating circuit 161, modulating circuit 162, and high-frequency amplifying circuit 163, which modulates carrier waves in 2.45 GHz band oscillated by the oscillating circuit 161 constituted by using a widely-known PLL circuit or the like by the modulating circuit 162 in accordance with an information signal input from the central processing portion 140, and supplies the modulated carrier waves to the antenna 110 as high-frequency current having a frequency in 2.45 GHz band through the high-frequency amplifying circuit 163 and antenna switching unit 120. In the case of this embodiment, the first frequency is equal to the second frequency. However, it is also allowed that the first frequency is different from the second frequency.

The sensor portion 170 is constituted of an acceleration sensor 10 and A/D converting circuit 171.

The acceleration sensor 10 is constituted of the semiconductor acceleration sensor shown in FIGS. 6 to 9.

Figure 6:
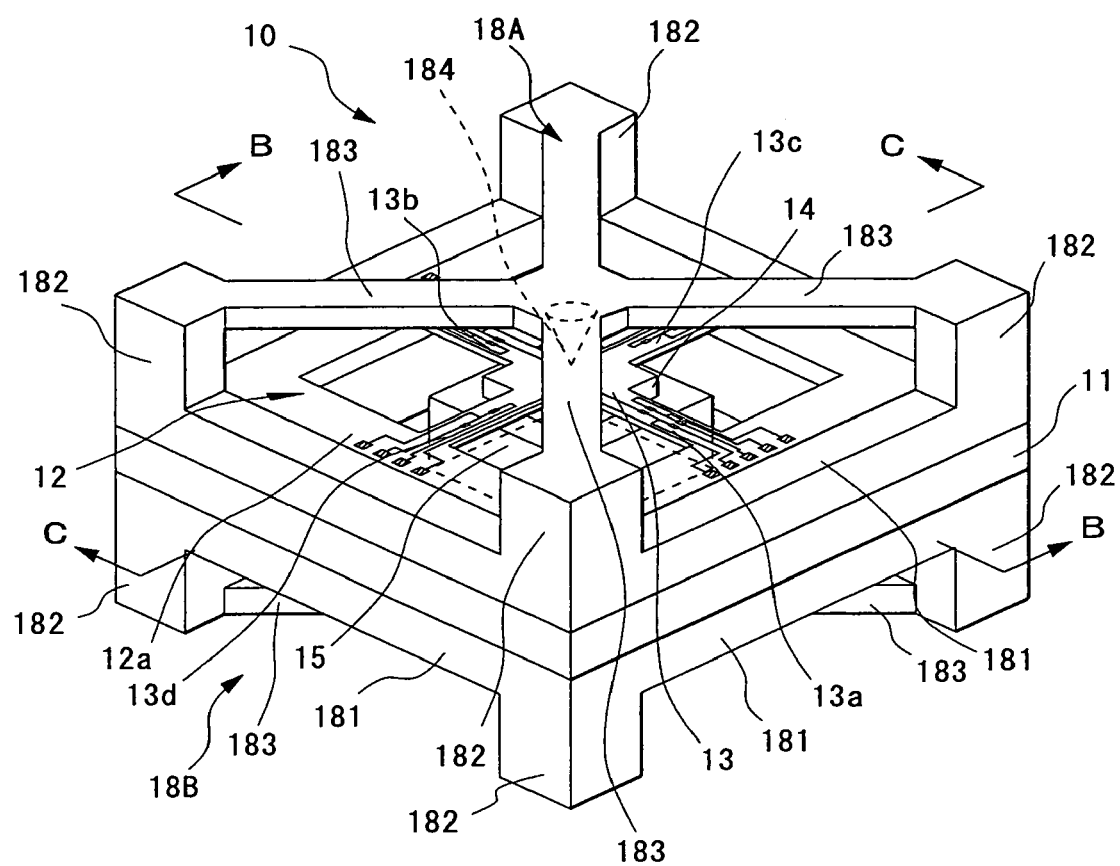
FIG. 6 is a perspective view of the appearance of a semiconductor acceleration sensor of the first embodiment of the present invention.
Figure 7:
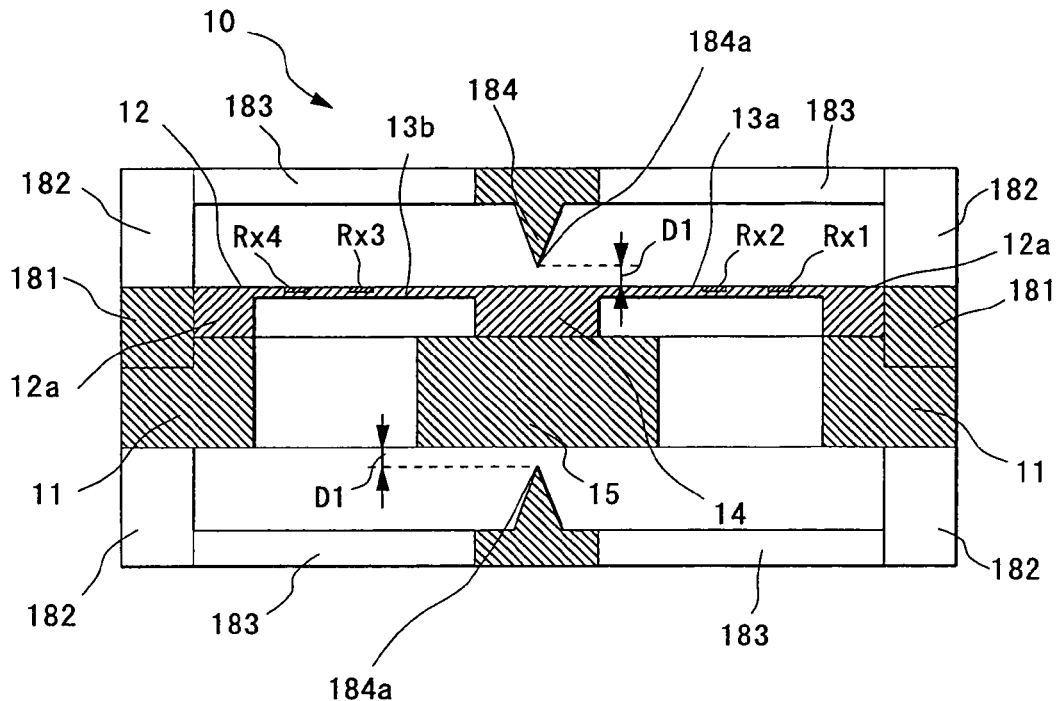
FIG. 7 is a sectional view taken along the line B-B in FIG. 6.
Figure 8:
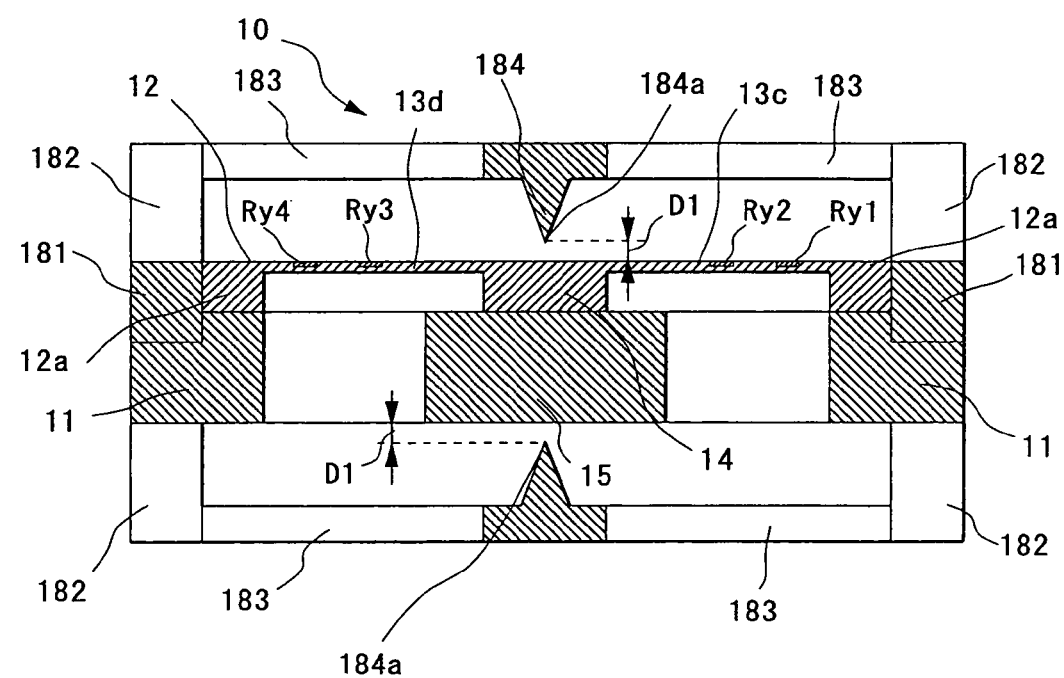
FIG. 8 is a sectional view taken along the line C-C in FIG. 6.
Figure 9:
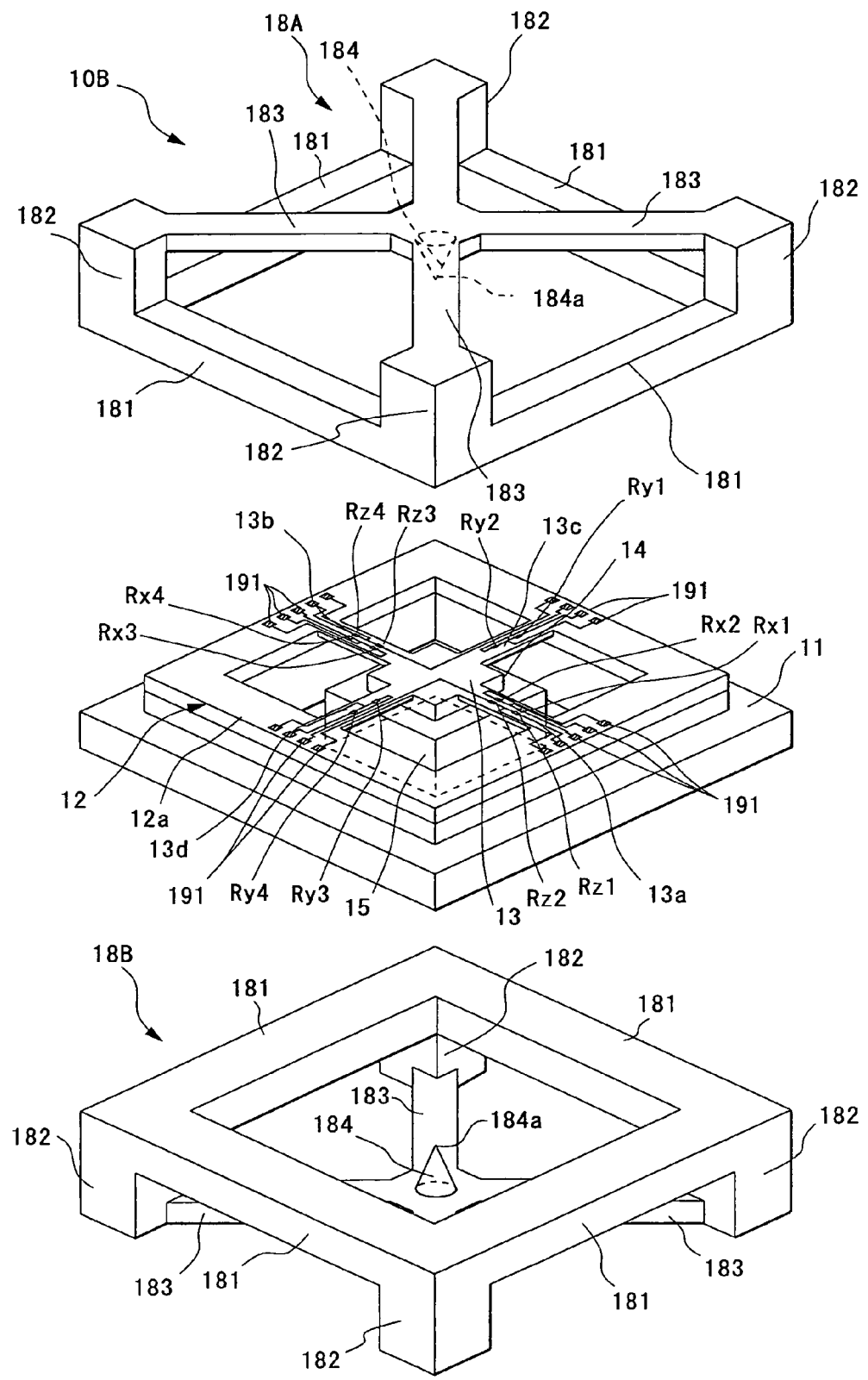
FIG. 9 is an exploded perspective view showing a semiconductor acceleration sensor of the first embodiment of the present invention.

FIG. 6 is an appearance perspective view showing the semiconductor acceleration sensor of the first embodiment of the present invention, FIG. 7 is a sectional view taken along the line B-B in FIG. 6, FIG. 8 is a sectional view taken along the line C-C in FIG. 6, and FIG. 9 is an exploded perspective view.

In FIGS. 6 to 9, reference numeral 10 denotes a semiconductor acceleration sensor which is constituted of a pedestal 11, silicon substrate 12, and support medium 18A and 18B.

The pedestal 11 is a rectangular frame shape and a silicon substrate (silicon wafer) 12 is set onto an opening face of the pedestal 11. Moreover, the outer frame portion 181 of the support medium 18A and 18B is fixed to the outer periphery of the pedestal 11.

The silicon substrate 12 is set to the opening portion of the pedestal 11 and a thin-film cruciform diaphragm 13 is formed at the central portion in a wafer outer-peripheral frame portion 12a and piezo-resistance elements (diffusion resistors) Rx1-Rx4, Ry1-Ry4, and Rz1-Rz4 are formed on the upsides of diaphragm pieces 13a to 13d.

In detail, piezo-resistance elements Rx1, Rx2, Rz1, and Rz2 are formed on one diaphragm piece 13a of the diaphragm pieces 13a and 13b arranged in alignment and piezo-resistance elements Rx3, Rx4, Rz3, and Rz4 are formed on the other diaphragm piece 13b. Moreover, piezo-resistance elements Ry1 and Ry2 are formed on one diaphragm piece 13c of diaphragm pieces 13c and 13d arranged in alignment orthogonal to the diaphragm pieces 13a and 13b and piezo-resistance elements Ry3 and Ry4 are formed on the other diaphragm piece 13d. Moreover, these piezo-resistance elements Rx1-Rx4, Ry1-Ry4, and Rz1-Rz4 are connected as shown in FIG. 10 so that they can constitute a resistance bridge circuit for detecting accelerations in X-axis, Y-axis, and Z-axis directions orthogonal to each other and connected to a connecting electrode 181 set on the surface of the outer periphery of the silicon substrate 12.

Moreover, a thick film portion 14 is formed on one face of the central portion of the diaphragm 13 at the intersecting portion of the diaphragm pieces 13a to 13d and a cubic heavy spindle 15 made of glass is set to the surface of the thick film portion 14.

The above support medium 18A and 18B are respectively constituted of the rectangular-frame-shaped outer frame portion 181, four supports 182 vertically set to four corners of a fixed portion, a cruciform beam portion 183 set so as to connect front ends of the supports, and a conical protruding portion 184 set to the central intersecting portion of the beam portion 183.

The outer frame portion 181 is fitted and fixed to the outer periphery of the pedestal 11 so that the protruding portion 184 is located at the other side of the diaphragm 13, that is, the side where the heavy spindle 15 is not present. In this case, the apex 184a of the protruding portion 184 is set so that it is located at a position of a distance D1 from the diaphragm 13 or the surface of the heavy spindle 15. The distance D1 is set to a value that displacements of the diaphragm pieces 13a to 13d can be restricted by the protruding portion 184 so that the diaphragm pieces 13a to 13d are not completely extended even if acceleration is generated in the direction vertical to the face of the diaphragm 13 and a force equal to or more than a predetermined value is applied to the both sides of the diaphragm 13 due to the acceleration.

When using the semiconductor acceleration sensor 10 of the above configuration, three resistance bridge circuits are constituted as shown in FIGS. 11 to 13. That is, the positive pole of a DC power supply 32A is connected to the connection point between one end of the piezo-resistance element Rx1 and one end of the piezo-resistance element Rx2 and the negative pole of the DC power supply 32A is connected to the connection point between one end of the piezo-resistance element Rx3 and one end of the piezo-resistance element Rx4 as shown in FIG. 11 as a bridge circuit for detecting X-axis-directional acceleration. Moreover, one end of a voltage detector 31A is connected to the connection point between the other end of the piezo-resistance element Rx1 and the other end of the piezo-resistance element Rx4 and the other end of the voltage detector 31A is connected to the connection point between the other end of the piezo-resistance element Rx2 and the other end of the piezo-resistance element Rx3.

Moreover, as a bridge circuit for detecting Y-axis-directional acceleration, as shown in FIG. 12, the positive pole of a DC power supply 32B is connected to the connection point between one end of the piezo-resistance element Ry1 and one end of the piezo-resistance element Ry2 and the negative pole of the DC power supply 32B is connected to the connection point between one end of the piezo-resistance element Ry3 and one end of the piezo-resistance element Ry4. Moreover, one end of a voltage detector 31B is connected to the connection point between the other end of the piezo-resistance element Ry1 and the other end of the piezo-resistance element Ry4 and the other end of the voltage detector 31B is connected to the connection point between the other end of the piezo-resistance element Ry2 and the other end of the piezo-resistance element Ry3.

Furthermore, as a bridge circuit for detecting Z-axis-directional acceleration, as shown in FIG. 13, the positive pole of a DC power supply 32C is connected to the connection point between one end of the piezo-resistance element Rz1 and one end of the piezo-resistance element Rz2 and the negative pole of the DC power supply 32C is connected to the connection point between one end of the piezo-resistance element Rz3 and one end of the piezo-resistance element Rz4. Moreover, one end of a voltage detector 31C is connected to the connection point between the other end of the piezo-resistance element Rz1 and the other end of the piezo-resistance element Rz4 and the other end of the voltage detector 31C is connected to the connection point between the other end of the piezo-resistance element Rz2 and the other end of the piezo-resistance element Rz4.

According to the semiconductor acceleration sensor 10 of the above configuration, when a force generated in accordance with the acceleration applied to the sensor 10 is applied to the heavy spindle 15, a deflection occurs in each of the diaphragm pieces 13a to 13d and thereby, resistance values of the piezo-resistance elements Rx1-Rx4, Ry1-Ry4, and Rz1-Rz4 are changed. Therefore, by forming a resistance bridge circuit by the piezo-resistance elements Rx1-Rx4, Ry1-Ry4, and Rz1-Rz4 set to the diaphragm pieces 13a to 13d, it is possible to detect accelerations in X-, Y-, and Z-axis directions orthogonal to each other.

Figure 14:
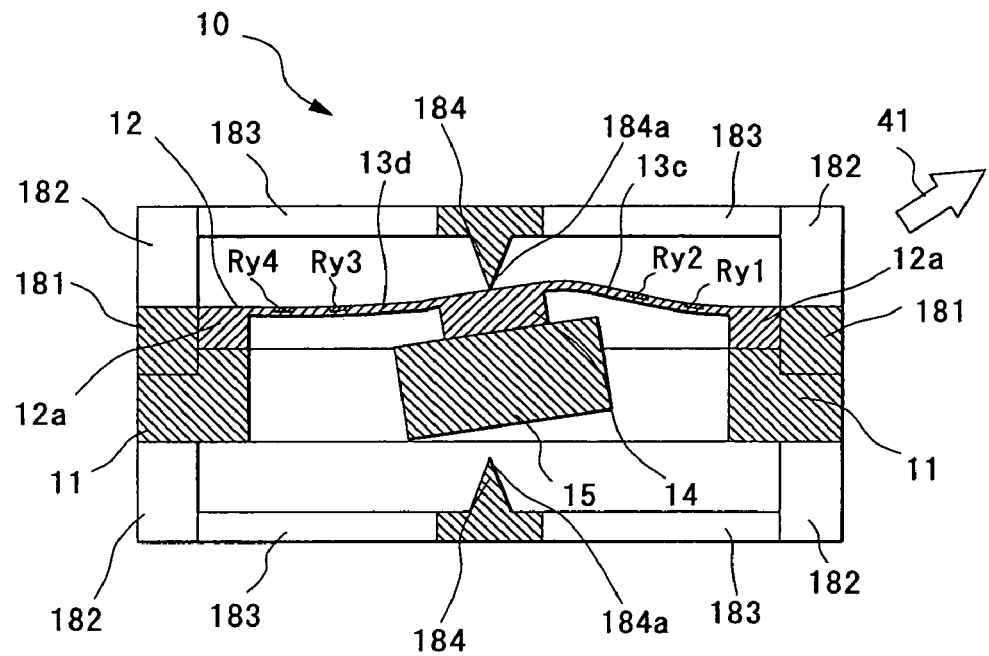
FIG. 14 is an illustration for explaining operations of the semiconductor acceleration sensor of the first embodiment of the present invention.
Figure 15:
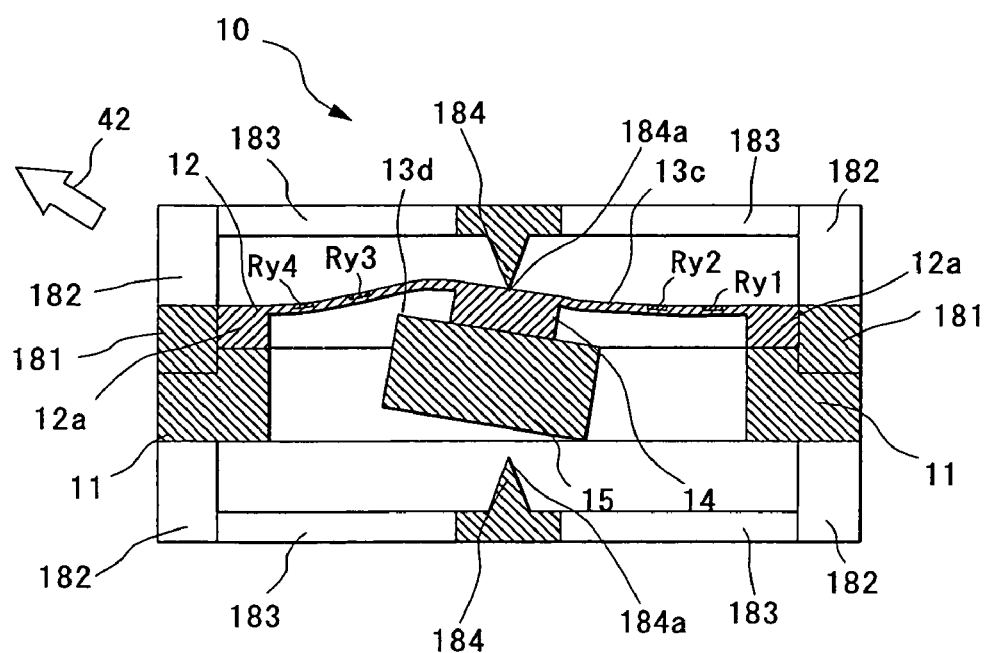
FIG. 15 is an illustration for explaining operations of the semiconductor acceleration sensor of the first embodiment of the present invention.

Moreover, as shown in FIGS. 14 and 15, when acceleration in which forces 41 and 42 respectively including a force component vertical to an face of the diaphragm 13 work is added and a force equal to or more than a predetermined value is added to the other face of the diaphragm 13, the diaphragm 13 is deflected and extended in the direction in which the forces 41 and 42 work and its displacement is supported and restricted by the apex 184a of the protruding portion 184. Therefore, the diaphragm pieces 13a to 13d are not maximally extended. Thereby, also when a force equal to or more than a predetermined value is added to the other face of the diaphragm 13, the position of the heavy spindle 15 is changed because the apex 184a of the protruding portion 184 serves as a fulcrum. Therefore, it is possible to detect the acceleration in the direction parallel with a face of the diaphragm 13.

Figure 16:
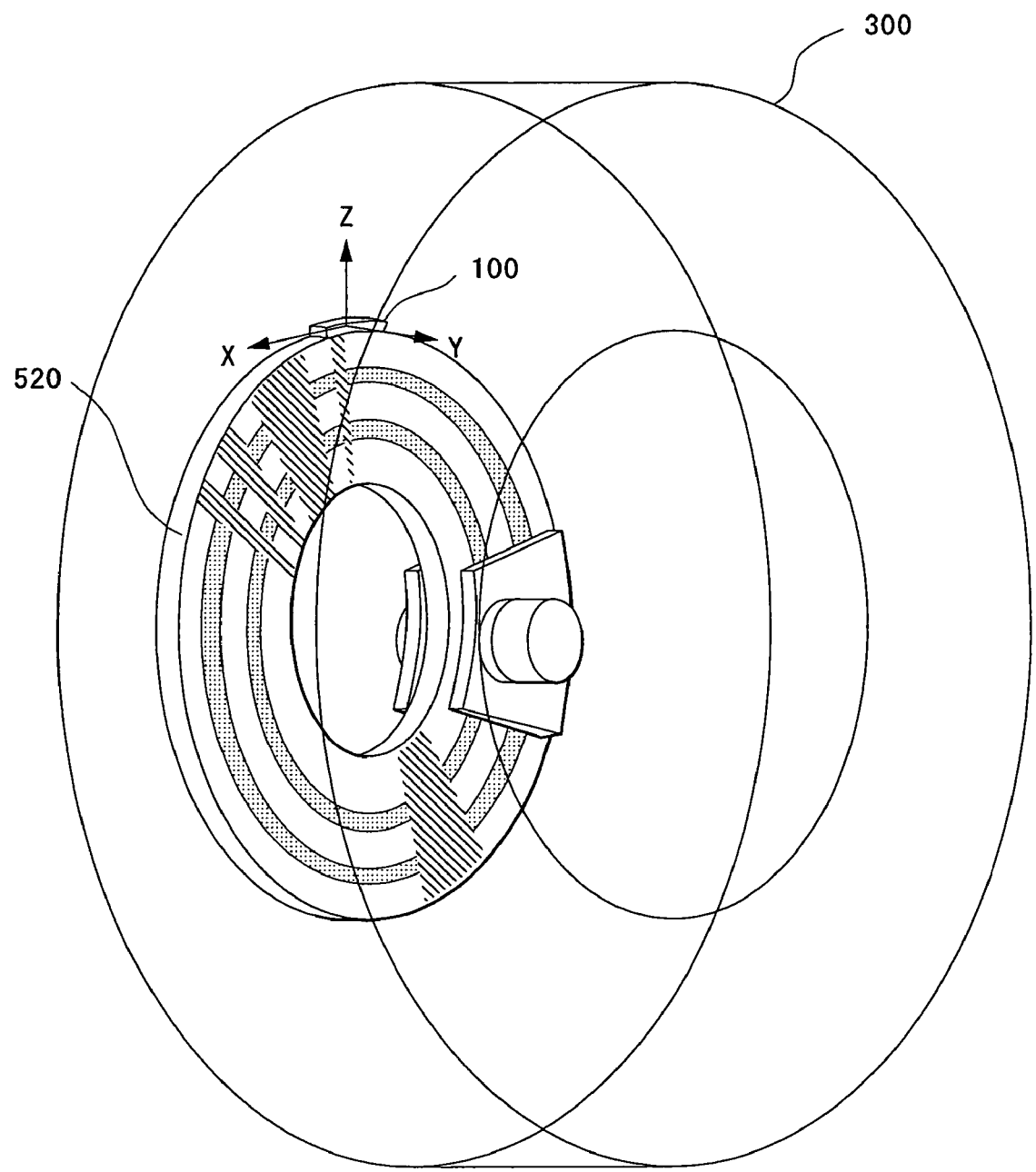
FIG. 16 is an illustration for explaining accelerations in X-, Y-, and Z-axis directions to be detected by the acceleration sensor of the sensor unit of the first embodiment of the present invention.

As shown in FIG. 16, when the tire 300 rotates and vehicle runs, the acceleration sensor 10 can detect accelerations in X-, Y-, and Z-axis directions orthogonal to each other generated in accordance with the rotation of the tire 300. In this case, the sensor unit 100 is set so that X-axis corresponds to the rotating direction of the tire 300, Y-axis corresponds to the rotating-shaft direction, and Z-axis corresponds to the direction orthogonal to the rotating shaft.

However, A/D converting circuit 171 converts an analog electrical signal output from the acceleration sensor 10 into a digital signal and outputs the digital signal to the CPU 141. The digital signal corresponds to values of accelerations in the above X-, Y-, and Z-directions.

As accelerations generated in X-, Y-, and Z-axis directions, positive-directional acceleration and negative-directional acceleration are present. This embodiment can detect both-directional accelerations.

Moreover, as to be described later, it is possible to obtain the rotating speed of a wheel from X-axis-directional acceleration and calculate the rotating speed of a wheel per unit time by the central processing portion 140 of the sensor unit 100 and transmit the rotating speed together with the digital information.

Furthermore, in the case of this embodiment, as described above, by using a frequency in 2.45 GHz band as the above first and second frequencies, the influence of the belts 303A and 303B in which reinforcement metallic wire of the tire 300 is woven is not easily received. Therefore, it is possible to perform stable communication even if fixing the sensor unit 100 to the rim 306. Thus, not to easily receive the influence by metal in a tire such as reinforcement metallic wire, it is preferable to use a frequency of 1 GHz or higher as the above first and second frequencies.

Furthermore, it is possible to embed the sensor unit 100 in the tire 300 when manufacturing the tire 300. In this case, it is needless to say that an IC chip and other components are designed so as to sufficiently withstand the heat under vulcanization.

As shown in FIGS. 1 and 2, each monitor system 200 is fixed to each tire house 400 and connected to the braking control unit 600 by the cable shown in FIG. 1, and is operated by the electric energy sent from the braking control unit 600.

Figure 17:
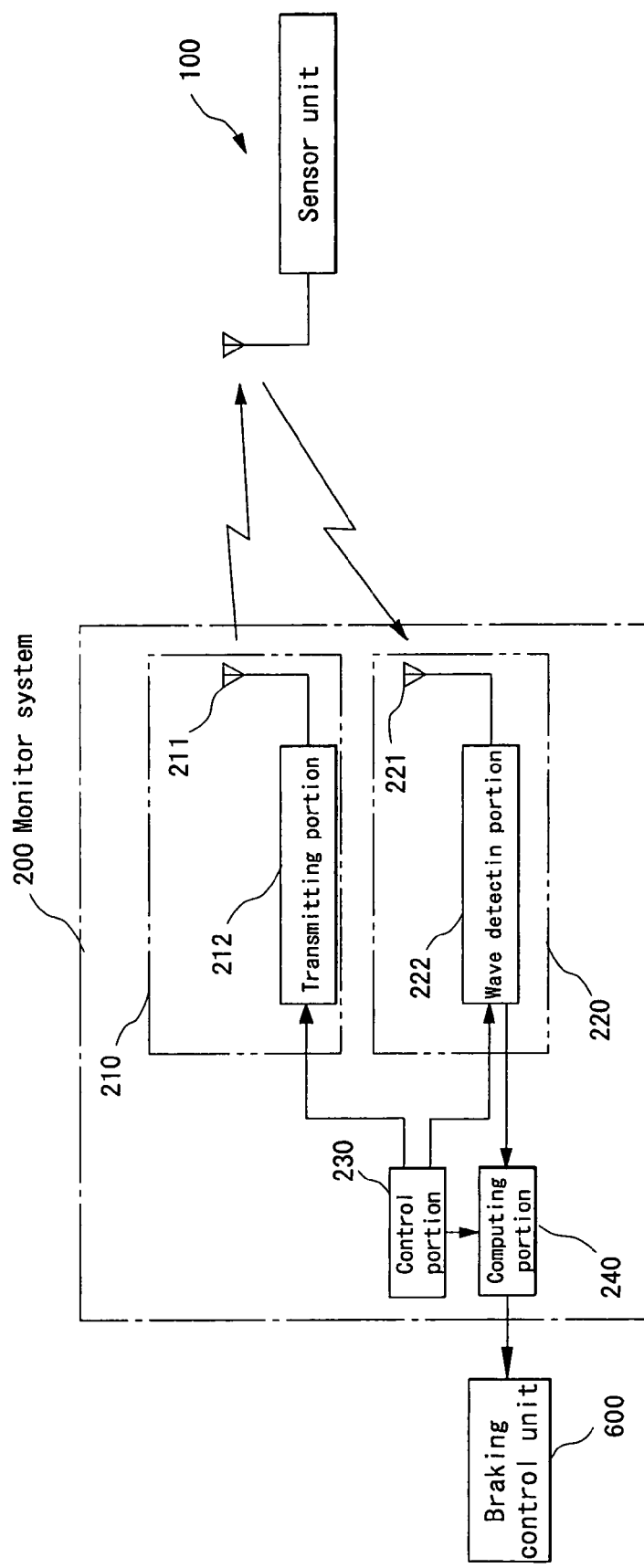
FIG. 17 is a block diagram showing an electric circuit of a monitor system of the first embodiment of the present invention.

As shown in FIG. 17, the electric circuit of the monitor system 200 is constituted of a radiation unit 210, wave receiving unit 220, control portion 230, and computing portion 240. In this case, the control portion 230 and computing portion 240 are respectively constituted of a memory circuit including a widely known CPU, ROM storing a program for operating the CPU, and RAM required to perform arithmetic processing, and so on.

The radiation unit 210 is constituted of an antenna 211 for radiating electromagnetic waves of a predetermined frequency (the above first frequency) in 2.45 GHz band and an transmitting portion 212 and radiates electromagnetic waves of the above first frequency from the antenna 211 in accordance with a designation from the control portion 230.

As an example of the transmitting portion 212, configuration can be listed from the oscillating circuit 161, modulating circuit 162, and high-frequency amplifying circuit 163 as well as the transmitting portion 160 of the sensor unit 100. Thereby, electromagnetic waves of 2.45 GHz are radiated from the antenna 211. The high-frequency power output from the originating portion 212 is set to a value capable of supplying electric energy to the sensor unit 100 from the antenna 211 for radiating electromagnetic waves of the monitor system 200. Thereby, it is possible to detect the acceleration of the tire 300 for each monitor system 200.

The wave-receiving unit 220 is constituted of an antenna 221 for receiving electromagnetic waves of a predetermined frequency (the above second frequency) in 2.45 GHz and a wave detecting portion 222. Electromagnetic waves of the above second frequency received by the antenna 221 are detected, a signal obtained through the wave detection is converted into a digital signal and output to the computing portion 240 based on an instruction from the control portion 230. As an example of the wave detecting portion 222, a circuit same as the wave detecting portion 150 of the sensor unit 100 is listed.

When the control portion 230 starts operations because electric energy is supplied from the braking control unit 600, it drives the transmitting portion 212 and radiates electromagnetic waves only for a predetermined time t3 and thereafter, drives the wave detecting portion 222 for a predetermined time t4 and makes the wave detecting portion 222 output a digital signal to the computing portion 240. The computing portion 240 calculates the above acceleration in accordance with the digital signal and outputs the acceleration to the braking control unit 600. Thereafter, the control portion 230 repeats the processing same as the above mentioned.

In the case of this embodiment, the above radiation time t3 of the monitor system 200 is set to 0.15 ms and the above wave receiving time t4 is set to 0.30 ms. This embodiment can store a voltage equal to or higher than 3 V as electric energy sufficient to drive the sensor unit 100 by radiating electromagnetic waves from the radiation unit 210 only for the time t3.

The braking control unit 600 is mainly constituted of a widely-known CPU, captures a detection result output from each monitor system 200, and controls the pressure control valve 630.

That is, the deflection characteristic information showing relations between accelerations in the above X-, Y-, and Z-axis directions obtained from the monitor systems 200 and deflection value of the tire 300 is previously obtained through actual measurement of an experiment and stored in the braking control unit 600. Moreover, the braking control unit 600 estimates the deflection of each tire 300 in accordance with detection results of accelerations and deflection characteristic information, controls the pressure control valve 630 in accordance with the estimated tire deflection value and detection result of the rotating speed of each tire 300, and drives the brake driving actuator 640.

Figure 20:
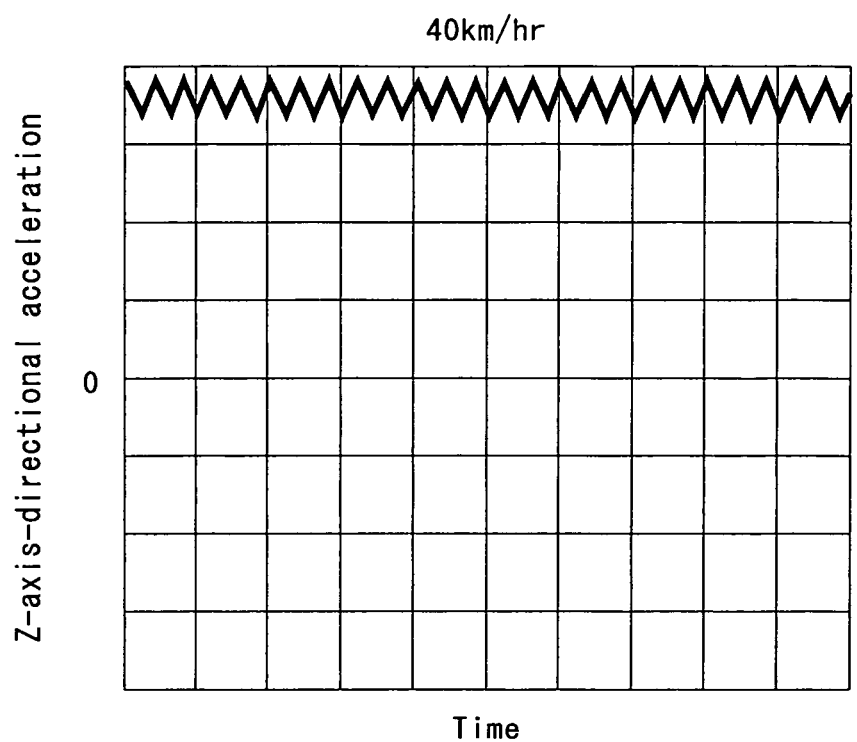
FIG. 20 is an illustration showing a measured result of the Z-axis-directional acceleration of the first embodiment of the present invention.

Then, operations of a system constituted of the above configuration are described below by referring to FIGS. 18 to 27. FIG. 18 to 20 show measured results of Z-axis-directional acceleration, FIGS. 21 to 23 show measured results of X-axis-directional acceleration, FIGS. 24 and 25 show measured results of Y-axis-directional acceleration, FIG. 26 shows a measured result of X-axis-directional acceleration when applying a brake, and FIG. 27 shows a measured result of Z-axis-directional acceleration when applying a brake.

In FIGS. 18 to 20, FIG. 18 shows a measured value of Z-axis-directional acceleration when a vehicle runs at 2.5 km per hour, FIG. 19 shows a measured value of Z-axis-directional acceleration when the vehicle runs at 20 km per hour, and FIG. 20 shows a measured value of Z-axis-directional acceleration when the vehicle runs at 40 km per hour. Thus, because the centrifugal force of a wheel increases as a running speed increases, Z-axis-directional acceleration also increases. Therefore, it is possible to obtain a running speed from Z-axis-directional acceleration. In FIGS. 18 to 20, a measured value is shown like a sine wave because it is influenced by gravitational acceleration.

Figure 21:
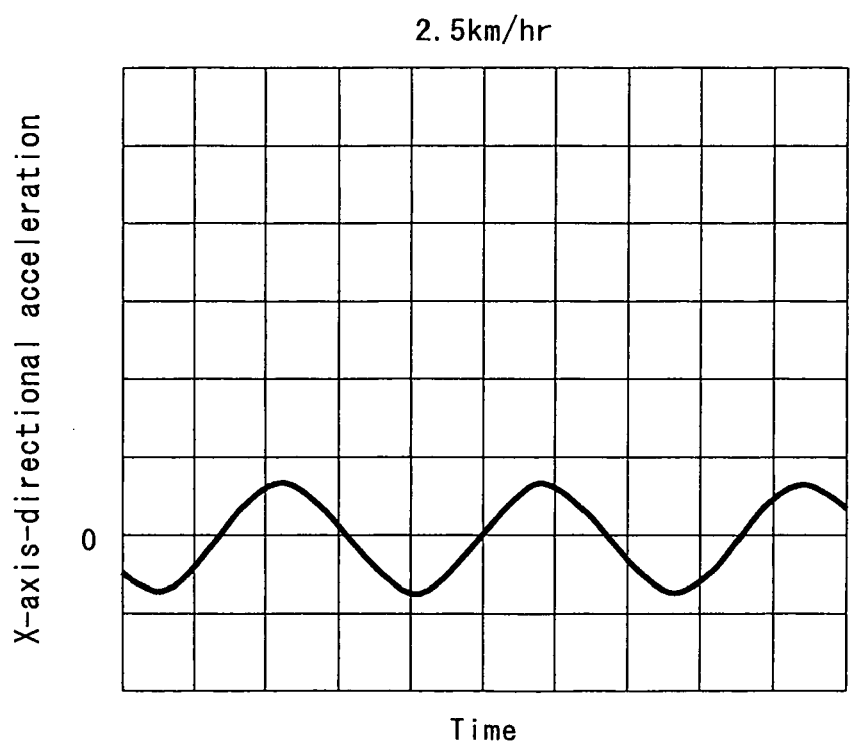
FIG. 21 is an illustration showing a measured result of the X-axis-directional acceleration of the first embodiment of the present invention.
Figure 22:
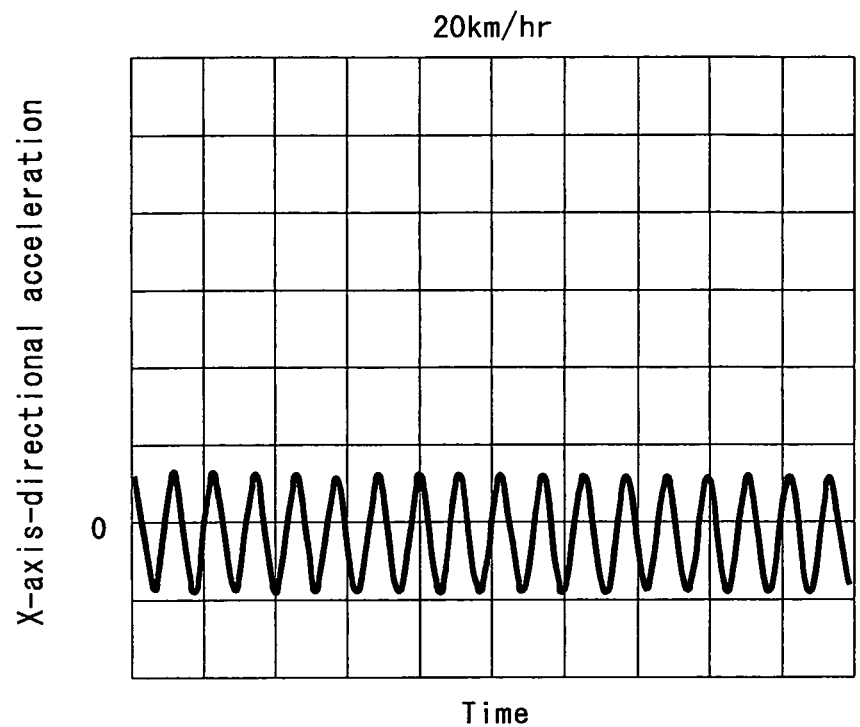
FIG. 22 is an illustration showing a measured result of the X-axis-directional acceleration of the first embodiment of the present invention.
Figure 23:
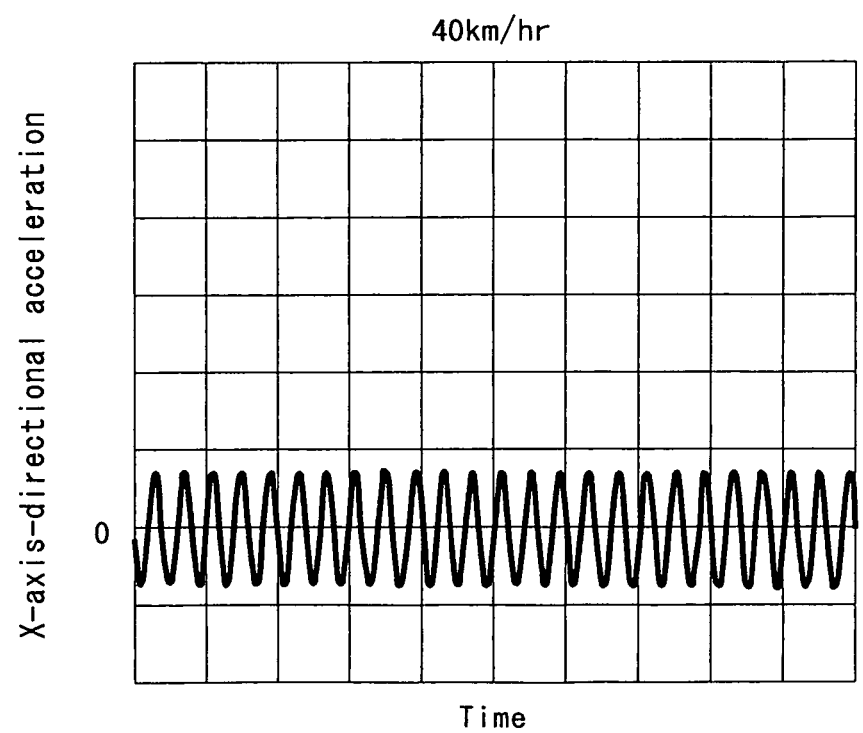
FIG. 23 is an illustration showing a measured result of the X-axis-directional acceleration of the first embodiment of the present invention.

In FIGS. 21 to 23, FIG. 21 is measured values of X-axis-directional accelerations when a vehicle runs at 2.5 km/hr, FIG. 22 is a measured value of X-axis-directional acceleration when a vehicle runs at 20 km/hr, and FIG. 23 is a measured value of X-axis-directional acceleration when a vehicle runs at 40 km/hr. Thus, because the rotating speed of a wheel increases as a running speed increases, the period of fluctuation in which X-axis-directional acceleration becomes shorter. Therefore, it is possible to obtain the rotating speed of a wheel from X-axis-directional acceleration. In FIGS. 21 to 23, a measured value shows a sine waveform because it is influenced by gravitational acceleration similarly to the above described.

FIG. 24 is a measured value of Y-axis-directional acceleration when turning a steering wheel clockwise during running of a vehicle and FIG. 25 is a measured value of Y-axis-directional acceleration when turning the steering wheel counterclockwise during running of the vehicle. Thus, Y-axis-directional acceleration memorably appears when turning a wheel to right or left by turning a steering wheel. Moreover, it is needless to say that when a vehicle is moved sideways, Y-axis-directional acceleration is similarly generated. Opposite-directional accelerations are generated in measured values of the above Y-axis-directional accelerations because a driver unconsciously turns a steering wheel in opposite direction.

Moreover, as shown in FIGS. 26 and 27, it is possible to accurately detect that the period from the time when applying a brake (brake ON: when stepping on a brake pedal) up to the time when the rotation of a wheel stops is approx. 0.2 sec.

Thus, by detecting the acceleration generated when stepping on the brake pedal 610, it is possible to estimate the deflection value of the tire 300 generated by the acceleration, side slip state of a vehicle body, idle running state of a tire or the like and control a pressure control valve during vehicle braking in accordance with these values.

Therefore, according to a braking control unit having the above-described tire state detector, it is possible to perform the control more accurate than ever because braking control is performed by using the sensor unit 100 and capturing detection results of X-, Y-, and Z-axis directional accelerations for each rotating mechanism portion 500 output from the monitor system 200 and rotating speed of a wheel per unit time to the braking control unit 600 in digital values though a conventional general braking controller captures a detection result output from a sensor for detecting the rotating speed of the tire 300 set to a vehicle to control the pressure control valve 630, for example.

For example, even if types of tires set to a vehicle are different and the friction force between a tire and road surface is changed, it is possible to perform high-accuracy control. Moreover, even in the case of a vehicle in which individual driving control is applied to each tire such as a 4WD vehicle, it is possible to perform high-accuracy control.

As described above, in the case of this embodiment, the sensor unit 100 receives electromagnetic waves radiated from the monitor system 200 and transmits a detection result when obtaining electric energy. Therefore, the above effect can be obtained without using the wave detecting portion 150. Moreover, by using a configuration in which the wave detecting portion 150 is set to the sensor unit 100 and setting a program so as to transmit a detection result from the sensor unit 100 when receiving the self identification information from the monitor system 200, the detection result is not transmitted due to unnecessary noises from the outside and thereby, it is possible to prevent radiation of unnecessary electromagnetic waves.

Moreover, in the case of the above embodiment, the deflection characteristic information showing a relation between acceleration obtained from the monitor system 200 and deflection value of the tire 300 is stored in the braking control unit 600 and the braking control unit 600 estimates the deflection value of the tire 300 in accordance with the detection result of the acceleration and the deflection characteristic information. However, it is also allowed that the deflection characteristic information is stored in the monitor system 200, the deflection value of the tire 300 is estimated by the monitor system 200 so as to output, the estimation result to the braking control unit 600, and the braking control unit 600 controls the pressure control value 630 in accordance with the estimation result so as to drive the brake driving actuator 640.

In the case of the above embodiment, the sensor unit 100 is fixed to the brake disk 520. However, it is also allowed to fix a body of rotation rotating at the rotating mechanism portion 500 to a rotating shaft (wheel shaft) or rotor 1.

Moreover, it is allowed to transfer digital information between the sensor unit 100 and the monitor system 200 in accordance with electromagnetic induction coupling using a coil or by using a brush used for a motor.

Then, the second embodiment of the present invention is described.

Figure 28:
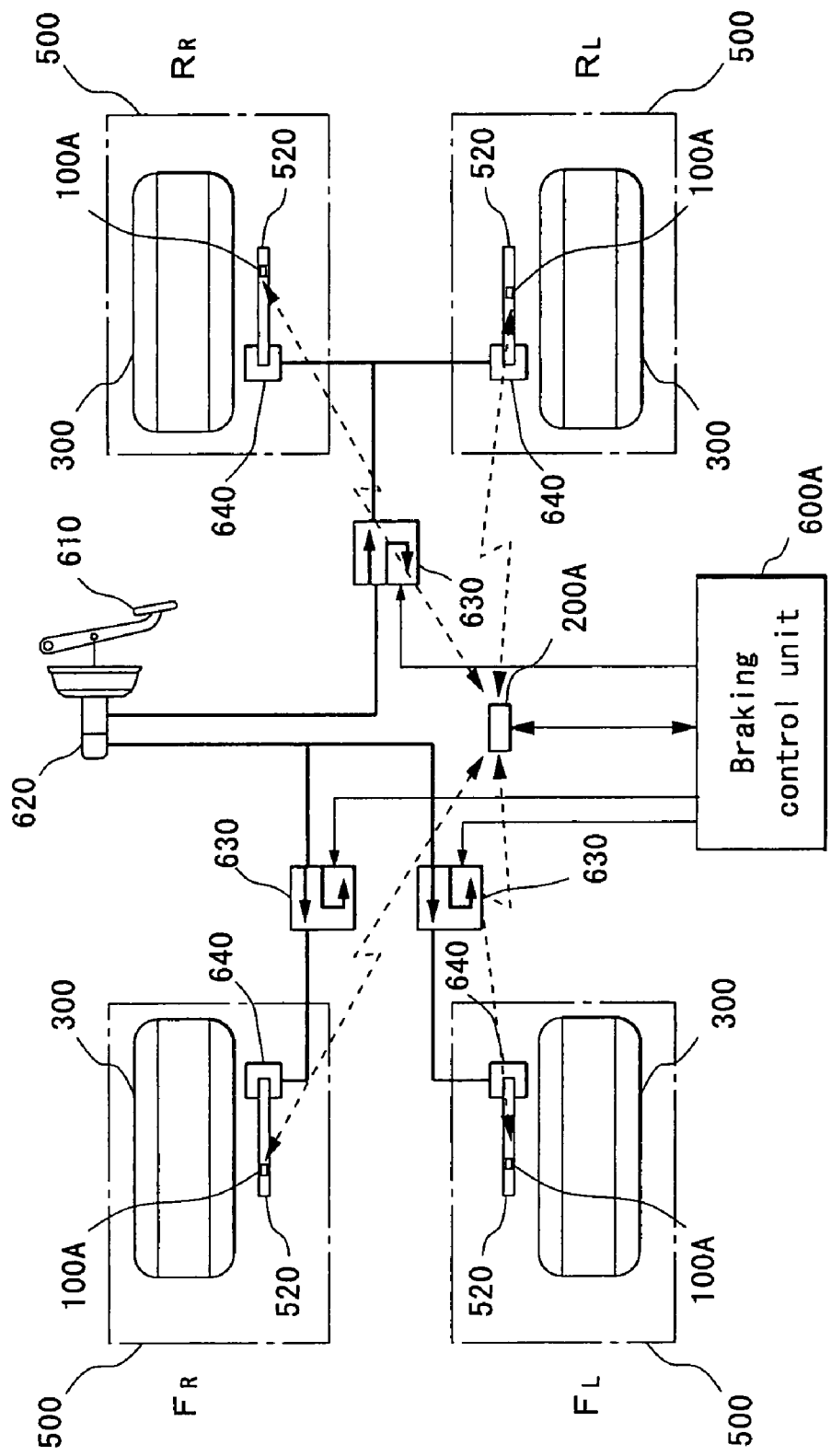
FIG. 28 is a schematic block diagram showing a braking control unit of a vehicle in second embodiment of the present invention.
Figure 29:
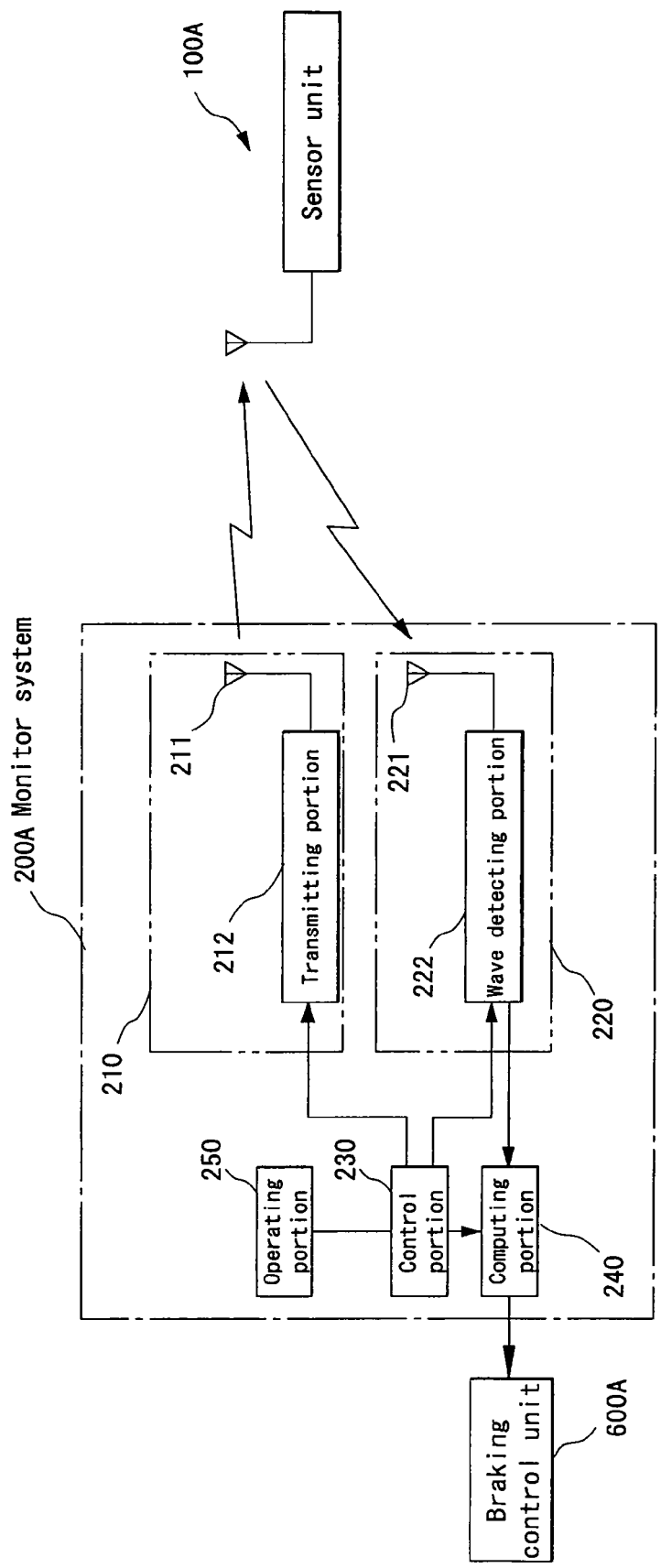
FIG. 29 is a block diagram showing an electric circuit of a monitor system of the second embodiment of the present invention.

FIG. 28 is a schematic block diagram showing a vehicle braking control unit of second embodiment of the present invention and FIG. 29 is a block diagram showing an electric circuit of a monitor system of the second embodiment. In FIGS. 28 and 29, a component shame as that of the above-described first embodiment is provided with the same symbol and its description is omitted. Moreover, the second embodiment is different from the first embodiment in that the second embodiment uses one monitor system 200A and a sensor unit 100A set to each rotating mechanism portion 500 are used.

The sensor unit 100A has a configuration same as that of the sensor unit 100 of the first embodiment. However, the sensor unit 100A is different from the sensor unit 100 of the first embodiment in that the program of the CPU 141 is set so as to detect each acceleration when receiving an information request designation including self identification information from the monitor system 200A and transmit the detection result as digital information together with the self identification information.

The monitor system 200A has a configuration same as the monitor system 200 of the first embodiment. However, the monitor system 200A is different from the monitor system 200 of the first embodiment in that an operating portion 250 for previously storing the identification information of the sensor unit 100A set to each tire 300 in the control portion 230 is used and the program of the control portion 230 is set so as to transmit an information request designation including the identification information of the sensor unit 100A to sensor units 100A of all tires 300 in a predetermined sequence or at random and output detection position information showing a detection result corresponding to the rotating mechanism portion 500 at which position of a vehicle together with a detection result when outputting the detection result to a braking control unit 600A.

According to the above configuration, it is possible to obtain detection results from all sensor units 100A by one monitor system 200A.

Then, the third embodiment of the present invention is described.

Figure 30:
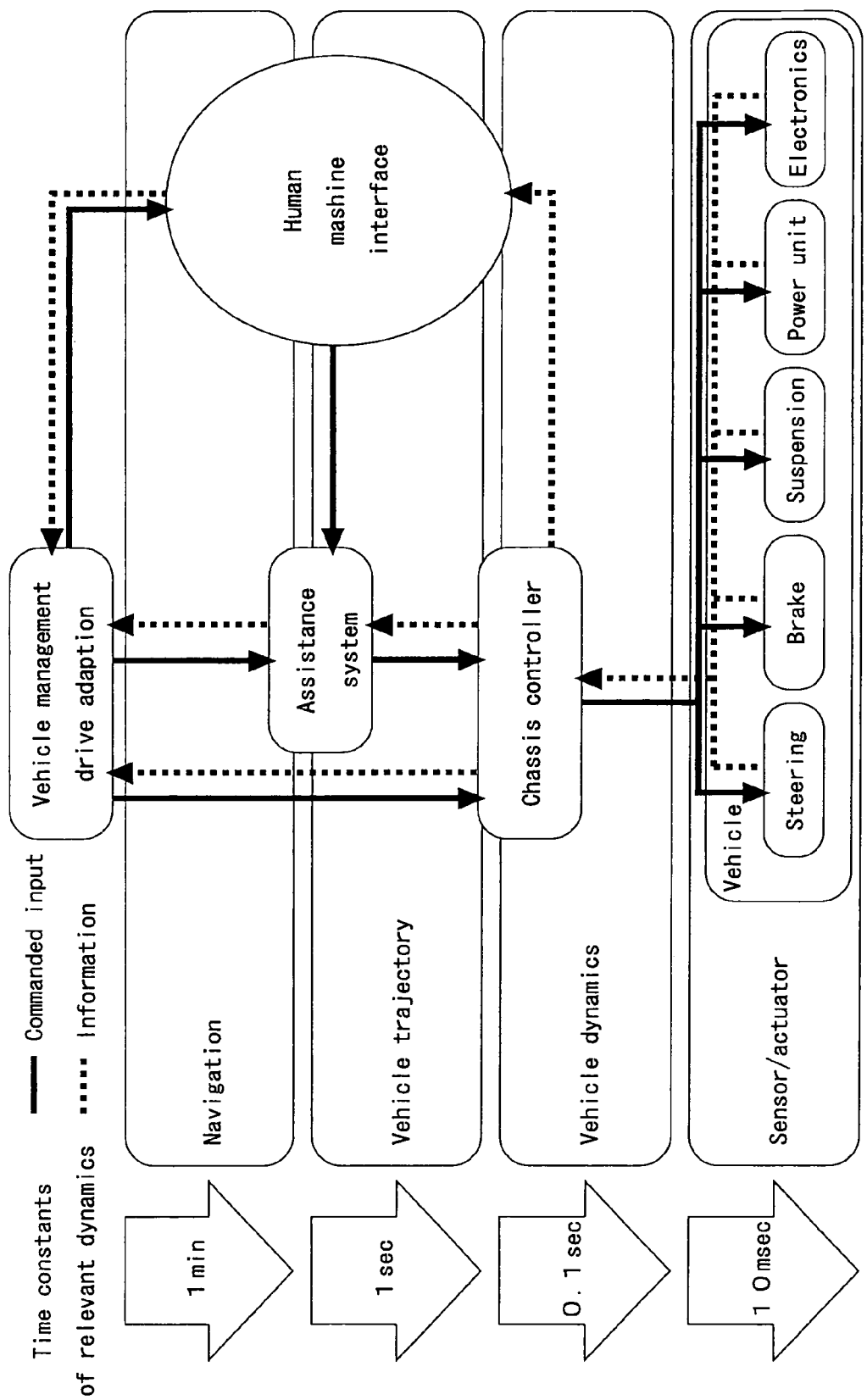
FIG. 30 is a conceptual view for explaining a time constant in vehicle control.
Figure 31:
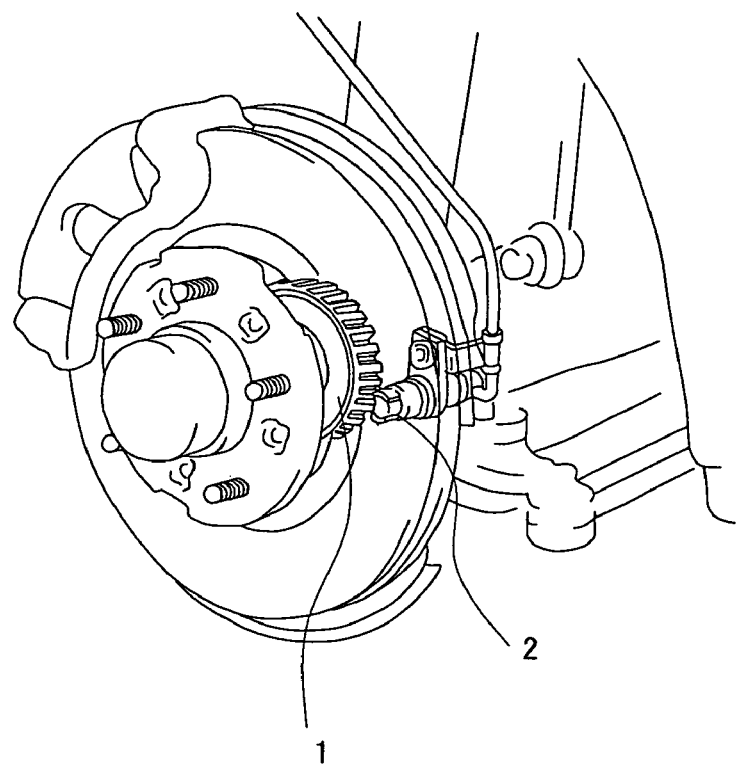
FIG. 31 is an illustration for explaining a conventional wheel rotating-speed detecting mechanism.
Figure 32:
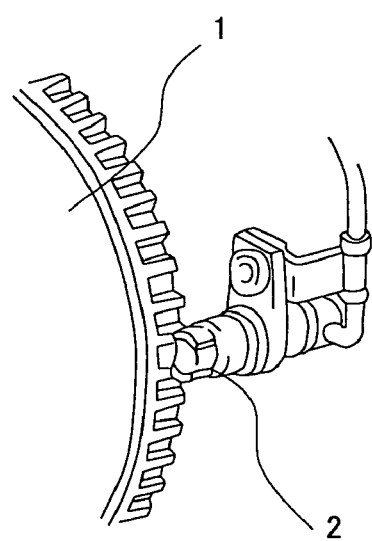
FIG. 32 is an illustration for explaining a conventional wheel rotating-speed detecting mechanism.
Figure 33:
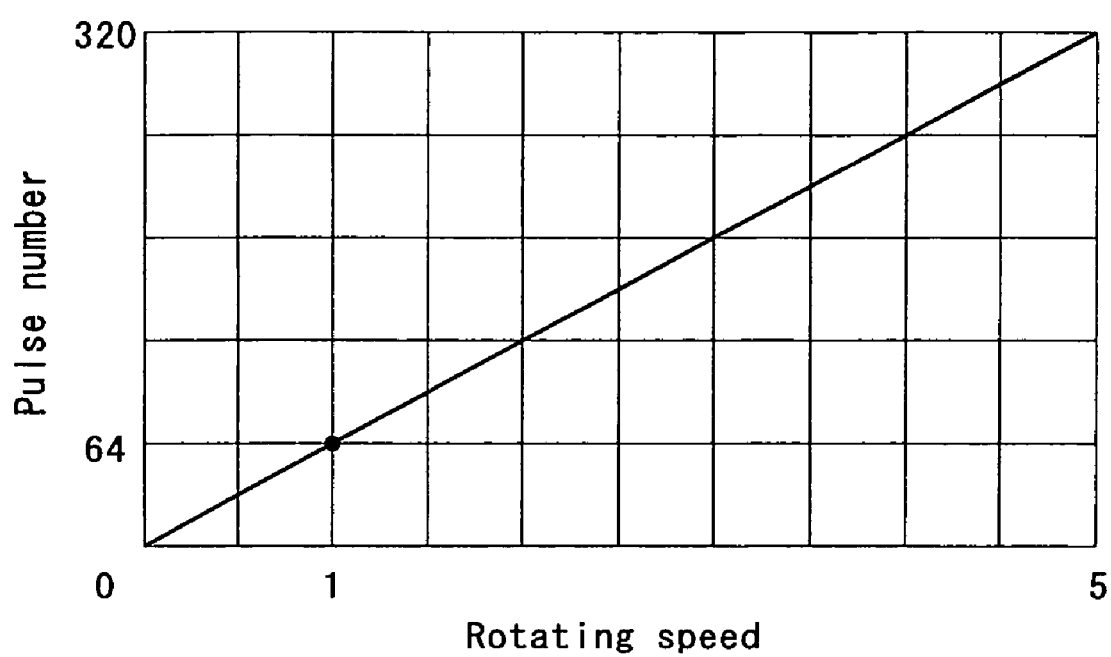
FIG. 33 is an illustration showing a relation between first rotating speed and pulse number in third embodiment of the present invention.
Figure 34:
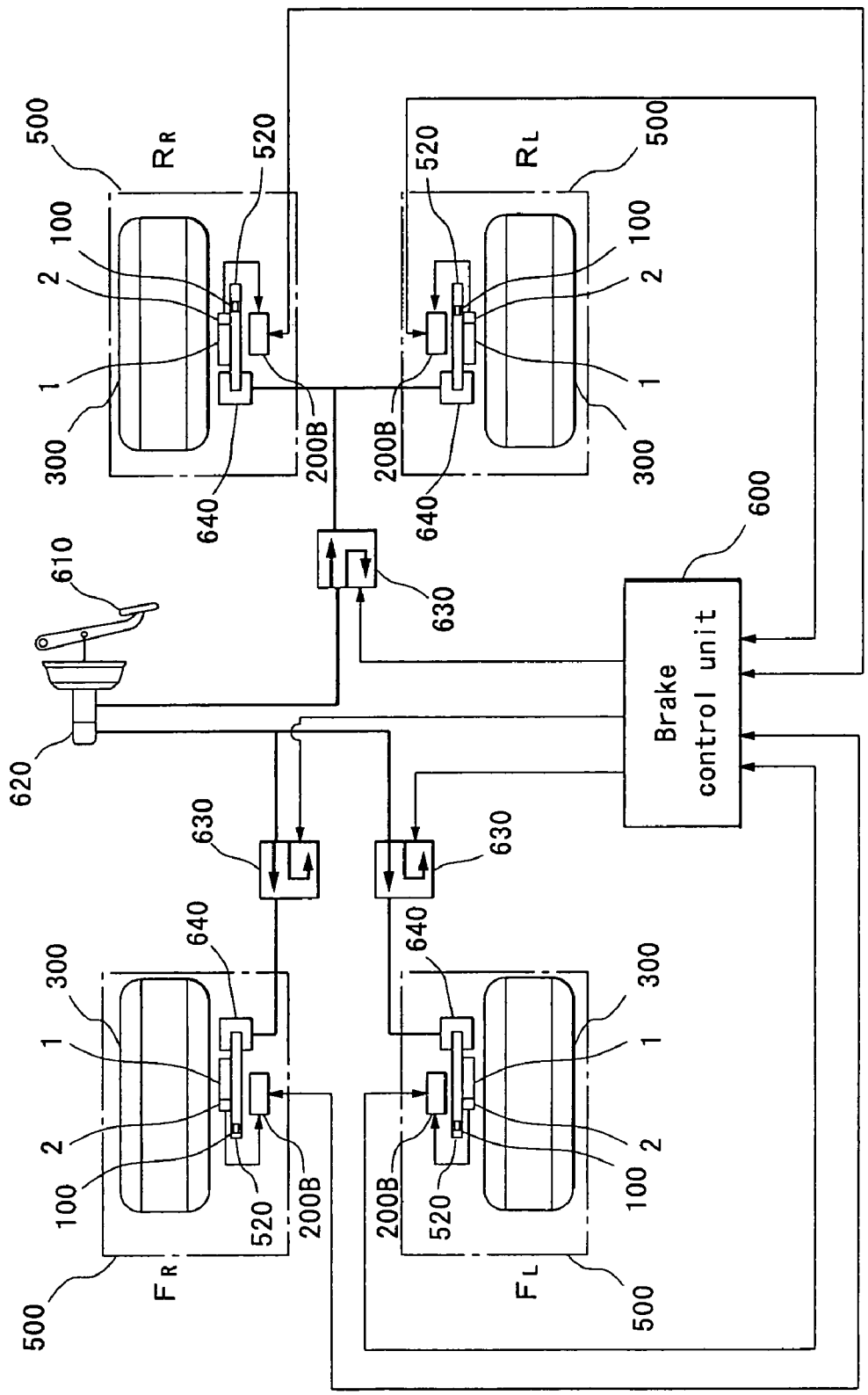
FIG. 34 is a schematic block diagram showing a vehicle braking control unit of the third embodiment of the present invention.

FIG. 30 is a conceptual view for explaining a time constant in vehicle control, FIG. 31 is an illustration for explaining the rotating-speed detecting mechanism of a vehicle of a conventional example, FIG. 32 is an illustration for explaining the rotating-speed detecting mechanism of a vehicle of a conventional example, FIG. 33 is an illustration showing a relation between first rotating speed and pulse number in the third embodiment of the present invention, FIG. 34 is a schematic block diagram showing a vehicle braking control unit of the third embodiment of the present invention, FIG. 35 is a block diagram showing an electric circuit of a monitor system of the third embodiment, FIG. 36 is an illustration showing a relation between second rotating speed and output voltage in the third embodiment of the present invention, and FIG. 37 is an illustration showing a relation between output voltage and pulse number in the third embodiment of the present invention. In FIGS. 30 to 37, a component same as that of the above-described first embodiment is provided with the same symbol and its description is omitted.

In general, a time constant requested for vehicle control depends on its motion analysis object. As shown in FIG. 30, the time constant is shortened in order of navigation, vehicle trajectory, vehicle dynamics, and sensor/actuator. For a chassis controller to drive each sensor/actuator and perform proper vehicle control, it is necessary to communicate information at a time interval of 10 msec from a steering wheel, brake, suspension, power unit, electronics and so on.

In the case of the first and second embodiments, there is not a limit of time accuracy according to the number of concave and convex portions like a convention wheel rotating speed detecting mechanism and digital information is transmitted or received at a time interval of 10 msec or less by the above configuration.

However, digital information lacking in adjustability with before and after information due to thermal noises or trouble of the sensor unit 100 may be transmitted or received. Therefore, means for confirming the reliability of the digital information is necessary.

The third embodiment is different from the first embodiment in that it is confirmed that the first rotating speed is detected by using the pickup sensor 2 set to each rotating mechanism portion 500 in the case of the third embodiment and the first rotating speed is the same as the second rotating speed calculated from the above X-axis-directional acceleration.

The pickup sensor 2 set nearby the rotor 1 is a conventional wheel rotating-speed detecting mechanism shown in FIGS. 31 and 32, in which a magnetic flux density is changed when a plurality of concave and convex portions formed on the periphery of the rotor 1 at equal intervals cross a magnetic field generated by the pickup sensor 2 and a pulsed voltage is generated in the coil of the pickup sensor 2. The pickup sensor 2 converts the voltage into a pulse signal and transmits the signal to a monitor system 200B connected by a cable. In the case of this embodiment, the number of concave and convex portions of the rotor 1 is set to 64. Therefore, pulse signals of 64 pulses per turn are output as shown in FIG. 33. Therefore, by counting the pulse number per unit time, it is possible to calculate the first rotating speed per unit time by counting the pulse number per unit time.

In the case of this embodiment, a pulse signal is transmitted by using a cable. However, it is also allowed to perform radio communication by using electromagnetic waves or that a pulsed voltage is directly transmitted and the monitor system 200B converts the voltage into a pulse signal.

Moreover, in the case of this embodiment, pickup sensor 2 set nearby the rotor 1 is shown. However, it is also allowed to use any sensor as long as the sensor detects the first rotating speed of a wheel at the rotating mechanism portion 500.

The monitor system 200B has a configuration same as that of the monitor system 200 of the first embodiment. However, the monitor system 200B is different from the monitor system 200 of the first embodiment in that a converting portion 260 for converting the second rotating speed per unit time output from the computing portion 240 into a pulse signal and a determining portion 270 for comparing the pulse signal of the first rotating speed transmitted from the pickup sensor 2 with the pulse signal of the second rotating speed are used.

As shown in FIG. 35, the converting portion 260 is constituted /// of a frequency/voltage (hereafter referred to as F/V) converting circuit 261 and a voltage control oscillating circuit 262. The F/V converting circuit 261 converts the second rotating speed per unit time calculated from X-axis-directional acceleration and output from the control portion 240 into a voltage corresponding to the rotating speed (=frequency) per unit time. In the case of this embodiment, as shown in FIG. 36, the circuit 261 is set so as to output a voltage of 0.4[V] per turn. The voltage control oscillating circuit 262 is constituted of a widely known VCO (voltage-controlled oscillator) or the like and converts the voltage into a pulse signal corresponding to a voltage output from the F/V converting circuit 261. In the case of this embodiment, as shown in FIG. 37, the circuit 262 is set so as to output pulse signals of 1,024 pulses for 0.4[V] (=one turn).

Thereby, the second rotating speed has vibrations corresponding to the rotating speed and the vibrations are converted into a pulse signal shown by pulses and can be easily compared with the pulse signal of the first rotating speed transmitted from the above pickup sensor 2.

It is also allowed to set the above configuration to the central processing portion 140 of the sensor unit 100 and convert the second rotating speed into the pulse signal of the second rotating speed and transmit the data together with the digital information.

The determining portion 270 is constituted of a memory circuit including a widely-known CPU, a ROM in which a program for operating the CPU is stored, a RAM required to perform arithmetic processing, and so on. The determining portion 270 receives the pulse signal of the first rotating speed transmitted from the pickup sensor 2 and the pulse signal of the second rotating speed output from the F/V converting circuit 261, determines whether the first rotating speed is equal to the second rotating speed in accordance with the pulse signals, and outputs the determination result to the braking control unit 600 together with the detection result of each acceleration.

Operations of a system constituted of the above configuration are described below by referring to FIGS. 38 to 40. In the case of the description here, it is assumed that the rotating period according to the first rotating speed is T1, the pulse signal period according to the first rotating speed is t1, the rotating period according to the second rotating speed is T2, and the pulse signal period according to the second rotating speed is t2.

In the case of the pulse signal of the first rotating speed, because 64 pulses are generated for every time T1 in which a wheel rotates by one turn, one pulse is generated for every T1/64 (t1=T1/64). Moreover, in the case of the pulse signal of the second rotating speed, because 1,024 pulses are generated for every time T2 in which a wheel rotates by one turn, one pulse is generated for every time T2/1,024 (t2=T2/1,024). Therefore, in the case of the pulse signal of the first rotating speed and the pulse signal of the second rotating speed, a predetermined number of pulses are generated independently of a rotating speed and the period of a pulse signal is changed in accordance with a change of rotating speeds.

When the first rotating speed is equal to the second rotating speed (T1=T2), as shown in FIG. 38, 16 pulses of the pulse signal of the second rotating speed are generated for one period of the pulse signal of the first rotating speed (t1=16× t2). Therefore, by adjusting the sync of the first pulse, the N-th pulse (N is an integer of 1 or more) of the pulse signal of the first rotating speed and the 16(N−1)+1st pulse of the pulse signal of the second rotating speed are generated at the same time.

The determining portion 270 determines that the first rotating speed is equal to the second rotating speed by measuring that the period of the pulse signal of the first rotating speed is t1 and the period of the pulse signal of the second rotating speed is t1/16 per unit time.

In the case of this embodiment, determination is performed by measuring periods of pulse signals generated per unit time. However, it is also allowed to determine whether the first rotating speed is equal to the second rotating speed by counting a predetermined number of pulses generated per unit time.

Therefore, according to the above configuration and operations, by using the pickup sensor 2 set to every rotating mechanism portion 500 and thereby, detecting the first rotating speed and confirming that the first rotating speed is equal to the second rotating speed calculated from the above X-axis-directional acceleration by the monitor system 200B, it is possible to assure the reliability of digital information including the X-axis-directional acceleration received from the sensor unit 100 and obtain the effect same as that of the first embodiment in accordance with the detection result in which the reliability is assured.

Moreover, as shown in FIG. 39, when the period of the pulse signal of the second rotating speed is not predetermined multiples of the period of the pulse signal of the first rotating speed (t2≠t1/16), the probability that the first rotating speed is not equal to the second rotating speed is high (T1≠T2) and it is considered that an error is present in the digital information serving as the basis of the second rotating speed. Moreover, as shown in FIG. 40, when the period of a specific pulse is shifted or removed in the pulse signal of the second rotating speed but other period is predetermined multiples of the period of the pulse signal of the first rotating speed (t2=t1/16), the probability that the first rotating speed is equal to the second rotating speed is high (T1=T2) and it is considered that an error is present in the pulse signal of the second rotating speed.

When it is considered that an error is present in the pulse signal of the second rotating speed in the case of the braking control unit 600 and braking control is performed in accordance with the detection result of each acceleration output from each monitor system 200B and the state in which it is considered that an error is present in digital information is continued for a certain period, it is preferable to add a safety function such as preventing a malfunction due to the detection result of each acceleration or communicating a trouble of each sensor unit 100.

Then, the fourth embodiment of the present invention is described below.

FIG. 41 is an illustration showing a relation between first running speed and pulse number in the fourth embodiment of the present invention, FIG. 42 is a schematic block diagram showing a vehicle braking controller of the fourth embodiment of the present invention, FIG. 43 is a block diagram showing an electric circuit of a monitor system of the fourth embodiment of the present invention, FIG. 44 is an illustration showing a relation between second running speed and output voltage in the fourth embodiment of the present invention, and FIG. 45 is an illustration showing a relation between output voltage and pulse number in the fourth embodiment of the present invention. In FIGS. 41 to 45, a component same as that of the above-described third embodiment is provided with the same symbol and its description is omitted.

The fourth embodiment is different from the third embodiment in that the first running speed is detected by using the above pickup sensor 2 and it is confirmed that the first running speed is equal to the second running speed calculated from the above Z-axis-directional acceleration in the case of the fourth embodiment.

In the case of this embodiment, the length for one turn of a tire is set to 2.2[m], running speed becomes approx. 8[Km/h] when assuming one turn/sec, and as shown in FIG. 41, the pickup sensor 2 outputs pulse signals of 64 pulses. Therefore, by counting the pulse number per sec, it is possible to calculate the first running speed.

A monitor system 200C has a configuration same as that of the monitor system 200B of the third embodiment. However, the monitor system 200C is different from the monitor system 200B of the third embodiment in that the F/V converting circuit 261 is unnecessary for the converting portion 260 for converting the second running speed output from the computing portion 240 into a pulse signal.

A voltage corresponding to Z-axis-directional acceleration detected by the above semiconductor acceleration sensor 10 is transmitted together with the above digital information, the second running speed is calculated from Z-axis-directional acceleration by the control portion 240, and a voltage of Z-axis-directional acceleration is output to the voltage control oscillating circuit 262. As shown in FIGS. 44 and 45, in the case of this embodiment, a voltage of 0.4[V] corresponds to a running speed of 8[Km/h] so as to output pulse signals of 1,024 pulses for 0.4[V]=8[Km/h].

By calculating the second running speed from Z-axis-directional acceleration and the second rotating speed per unit time from the second running speed, it is allowed to realize a configuration same as that of the above third embodiment.

Therefore, according to the above configuration, by detecting the first running speed by the pickup sensor 2 set to each rotating mechanism portion 500 and confirming that the first running speed is equal to the second running speed calculated from the above Z-axis-directional acceleration by the monitor system 200C, it is possible to assure the reliability of the digital information including the Z-axis-directional acceleration received from the sensor unit 100 and obtain the effect same as that of the first embodiment in accordance with the detection result in which the reliability is assured.

It is allowed to constitute a system by combining configurations of the above embodiments or replacing some configuration portions.

Moreover, in the case of each of the above embodiments, the first and second frequencies are set to 2.45 GHz. However, it is possible to accurately obtain the data detected by the sensor unit 100 by greatly decreasing the influence of reflection or blocking of electromagnetic waves by a metal in a tire by a frequency of 1 GHz or higher as previously described and it is allowed that the first frequency is different from the second frequency. It is preferable to properly set the first and second frequencies at the time of design.

In the case of each of the above embodiments, an anti-lock brake system of a four-wheel vehicle is described as an example. However, it is needless to say that it is possible to obtain the same effect from even a vehicle such as a vehicle of two wheels or six wheels or more other than a four-wheel vehicle.

A configuration of the present invention is not restricted only to the above-described embodiments. It is allowed to use various modifications of the present invention as long as they are not deviated from the gist of the present invention.

INDUSTRIAL APPLICABILITY OF THE INVENTION

Because it is possible to detect the acceleration generated by rotation of a wheel in a rotating mechanism portion, it is possible to estimate deflection value of a tire, side slip of a vehicle, and idle running of a wheel from the acceleration and use the acceleration for braking control of a vehicle.

Only by setting a sensor unit to a predetermined position of a body of rotation such as a wheel or wheel shaft of a rim, wheel, or tire body, it is possible to easily detect the acceleration generated by rotation of a wheel. Therefore, it is possible to use the sensor unit for detection of acceleration of a body of rotation without requiring cable wiring.

The invention claimed is:

1. A vehicle anti-lock brake system constituted so as to drive a brake driving actuator in accordance with detection results of a vehicle brake operating state and generate a target braking force, comprising:
    a rotating mechanism portion, said portion including a body of rotation configured to operably connect a wheel to a vehicle body side and to rotate the wheel;
    a sensor unit, said sensor unit configured to:
        detect a first acceleration and a second acceleration, the first acceleration being in a direction orthogonal to a rotating shaft in accordance with rotation, and the second acceleration being in the rotating direction,
        convert the detected first and second accelerations into first and second digital values, and
        transmit the first and second digital values;
    a monitor system configured to:
        receive the transmitted first and second digital values,
        obtain the detected first and second accelerations;
        obtain a speed of the vehicle from the obtained detected first acceleration; and
        obtain a rotating speed per unit time of the wheel from the obtained detected second acceleration; and
    a driving component configured to drive the brake driving actuator based at least partly on the obtained first and second accelerations,
    wherein said sensor unit is operably connected to said rotating mechanism portion.

2. The anti-lock brake system according to claim 1, wherein the sensor unit is configured to:
    detect a third acceleration, the third acceleration being in the rotating-shaft direction,
    convert the detected third acceleration into a third digital value, and
    transmit the third digital value,
wherein the monitor system is configured to:
    obtain the detected third acceleration, and
    detect rolling or horizontal movement of the rotating mechanism portion from the obtained detected third acceleration, and wherein the driving component is configured to drive the brake driving actuator based at least partly on the obtained first, second, and third accelerations.

3. The anti-lock brake system according to claim 1, characterized in that
wherein the sensor unit is configured to:
   detect a change of the second acceleration,
   determine a rotating speed per unit time based at least partly on the detected change of the second acceleration,
   convert the determined rotating speed into a rotating speed digital value, and
   transmit the rotating speed digital value to the monitor system,
wherein the monitor system is configure to receive the rotating speed digital value, and
wherein the driving component is configured to drive the brake driving actuator based at least partly on the obtained first and second accelerations and the determined rotating speed.

4. The anti-lock brake system according to claim 1, wherein the sensor unit is operably connected to the body of rotation.

5. The anti-lock brake system according to claim 1,
wherein the sensor unit is configured to:
   receive electromagnetic waves of a first frequency,
   convert energy of the received electromagnetic waves into driving electric energy, and
   transmit said digital value using electromagnetic waves of a second frequency, the transmitting being controlled using the driving electric energy, and
wherein the monitor system is configured to:
   radiate electromagnetic waves of the first frequency,
   receive electromagnetic waves of the second frequency; and
   extract the digital values from the received electromagnetic waves of the second frequency.

6. The anti-lock brake system according to claim 5, wherein the first frequency is equal to the second frequency.

7. The anti-lock brake system according to claim 1,
wherein the sensor unit is configured to store identification information specific to its own and to transmit digital information including the first and second digital values and the identification information, and
wherein the monitor system is configured to identify the rotating mechanism portion in accordance with the identification information.

8. The anti-lock brake system according to claim 1,
wherein the sensor unit comprises a semiconductor acceleration sensor comprising a silicon-piezo-type diaphragm for detecting accelerations orthogonal to each other.

9. The anti-lock brake system according to claim 1, further comprising:
a rotating speed detecting component operably connected to the rotating mechanism portion, the rotating speed detecting component configured to detect a first rotating speed per unit time of the wheel and to transmit the detected first rotating speed to the monitor system,
wherein the sensor unit is configured to:
   detect a change of the second acceleration,
   detect a second rotating speed per unit time in accordance with the change of the second acceleration,
   convert the detected second rotating speed into a rotating speed digital value, and
   transmit digital information including the first and second digital values and the rotating speed digital wherein the monitor system is configured to:
   receive the transmitted first rotating speed,
   receive the transmitted second rotating speed from the sensor unit, and
   determine whether the first rotating speed is equal to the second rotating speed.

10. The anti-lock brake system according to claim 9,
wherein the rotating speed detecting component is operably connected to the body of rotation,
wherein the rotating speed detecting component comprises a disk whose periphery has a plurality of concave and convex portions, and
wherein the rotating speed detecting component is configured to generate a magnetic field and to detect a voltage according to a change of the magnetic field.

11. The anti-lock brake system according to claim 9,
wherein the rotating speed detecting mechanism is configured to convert the detected first rotating speed into a first rotating speed digital signal,
wherein the monitor system is configured to convert the rotating speed digital value into a second rotating speed digital signal, and
wherein the monitor system is configured to determine whether the first rotating speed is equal to the second rotating speed in accordance with the first rotating speed digital signal and the second rotating speed digital signal.

12. The anti-lock brake system according to claim 11,
wherein the monitor system is configured to convert the rotating speed digital value into a second rotating speed digital value by multiplying the second rotating speed digital value by a predetermined value and converting the multiplication value into the second rotating speed digital signal comprising a period equal to the reciprocal of the multiplication value.

13. The anti-lock brake system according to claim 11,
wherein the monitor system is configured to determine that the first rotating speed is equal to the second rotating speed when the oscillations of the first rotating speed digital signal are generated for every predetermined multiples of a period of the second rotating speed digital signal.

14. The anti-lock brake system according to claim 1, further comprising:
a rotating speed detecting component operably connected to the rotating mechanism portion, the rotating speed detecting component being configured to detect a first running speed according to the rotation of the wheel and to transmit the detected first running speed to the monitor system,
wherein the sensor unit is configured to:
   detect a change of the first acceleration,
   detect a second running speed per unit time in accordance with the change of the first acceleration,
   to convert the detected second running speed into a second running speed digital value, and
   to transmit digital information including the first and second digital values and the second running speed digital value to the monitor system, and
wherein the monitor system is configured to:
   receive the detected first running speed from the rotating speed detecting component,
   receive the detected second running speed from the sensor unit, and
   to determine whether the first running speed is equal to the second running speed.

15. The anti-lock brake system according to claim 14,
wherein the rotating speed detecting component is operably connected to the body of rotation, and
wherein the rotating speed detecting component comprises has a disk whose periphery has a plurality of concave and convex portions at equal intervals,
wherein the rotating speed detecting component is configured to generate a magnetic field, and
wherein the rotating speed detecting component is configured to detect a voltage according to a change of the generated magnetic field.

16. The anti-lock brake system according to claim 14,
wherein the rotating speed detecting component is configured to convert the detected first running speed into a first running speed digital signal,
wherein the monitor system is configured to convert the second running speed digital value into a second running speed digital signal, and
wherein the monitor system is configured to determine whether the first running speed is equal to the second running speed in accordance with the first running speed digital signal and the second running speed digital signal.

17. The anti-lock brake system according to claim 16,
wherein the monitor system is configured to convert the second running speed digital value into a second running speed by multiplying the second running speed digital value by a predetermined value and converting the multiplication value into the second running speed digital signal comprising a period equal to the reciprocal of the multiplication value.

18. The anti-lock brake system according to claim 16,
wherein the monitor system is configured to determine that the first rotating speed is equal to the second rotating speed when oscillations of the second rotating speed digital signal are generated for every predetermined multiples of the period of the first rotating speed digital signal.

19. A sensor unit operably connected to a rotating mechanism portion including:
a body of rotation configured to:
fix a wheel operably connected to a vehicle body side, and
rotate the wheel,
means for detecting a first acceleration generated in the direction orthogonal to a rotating shaft in accordance with rotation;
means for detecting a second acceleration generated in a rotating direction;
means for converting the detected first and second accelerations into first and second acceleration digital values,
means for transmitting digital information including the first and second acceleration digital values;
means for receiving electromagnetic waves of a first frequency;
means for converting energy of the received electromagnetic waves into driving electric energy;
means to be operated by the electric energy to transmit the digital information by using electromagnetic waves of a second frequency;
means for obtaining a speed of the vehicle from the transmitted first acceleration digital value; and
means for obtaining a rotating speed per unit time of a wheel of the vehicle from the transmitted second acceleration digital value.

20. The sensor unit according to claim 19, further comprising:
means for detecting a third acceleration generated in the rotating-shaft direction, and
means for converting the detected third acceleration into a third acceleration digital value,
wherein the digital information to be transmitted by the transmitting means further comprises the second acceleration digital value.

21. The sensor unit according to claim 19, further comprising:
means for detecting a change of the second acceleration,
means for determining the rotating speed per unit time in accordance with the change of the second acceleration, and
means for converting the determined rotating speed into a rotating speed digital value, and
wherein the digital information to be transmitted by the transmitting means further comprises the rotating speed digital value.

22. The sensor unit according to claim 19, wherein the first frequency is equal to the second frequency.

23. The sensor unit according to claim 19, further comprising:
means for storing identification information specific to its own,
wherein the digital information to be transmitted by the transmitting means further comprises including the identification information.

24. The sensor unit according to claim 19, wherein the means for detecting the first acceleration and the means for detecting the second acceleration comprise a semiconductor acceleration sensor which has a silicon piezo-type diaphragm.

* * * * *

UNITED STATES PATENT AND TRADEMARK OFFICE
CERTIFICATE OF CORRECTION

PATENT NO. : 7,481,501 B2
APPLICATION NO. : 10/547384
DATED : January 27, 2009
INVENTOR(S) : Yutaka Hattori and Yasuo Hatano It is certified that error appears in the above-identified patent and that said Letters Patent is hereby corrected as shown below:

At Column 23, Line 18 (Specification), before "of" please delete "///".

At Column 27, Line 67 (Claims), after "speed digital" please insert --values,--.

Signed and Sealed this

Ninth Day of June, 2009

JOHN DOLL
*Acting Director of the United States Patent and Trademark Office*